US005763853A

United States Patent [19]

Shimomura et al.

[11] Patent Number: 5,763,853

[45] Date of Patent: Jun. 9, 1998

[54] LASER PROCESSING APPARATUS, LASER PROCESSING METHOD AND DAM BAR PROCESSING METHOD

[75] Inventors: Yoshiaki Shimomura; Naoki Miyanagi, both of Ibaraki-ken; Nobuhiko Tada, Ushiku; Yoshinari Nagano, Ibaraki-ken; Shinya Okumura, Tsuchiura; Shigeyuki Sakurai, Tsukuba, all of Japan

[73] Assignee: Hitachi Construction Machinery Co., Ltd., Tokyo, Japan

[21] Appl. No.: 557,102

[22] PCT Filed: Apr. 6, 1995

[86] PCT No.: PCT/JP95/00674

§ 371 Date: Dec. 6, 1995

§ 102(e) Date: Dec. 6, 1995

[87] PCT Pub. No.: WO95/29035

PCT Pub. Date: Nov. 2, 1995

[30] Foreign Application Priority Data

| | | | |
|---|---|---|---|
| Apr. 20, 1994 | [JP] | Japan | 6-081875 |
| Apr. 20, 1994 | [JP] | Japan | 6-081876 |
| Oct. 7, 1994 | [JP] | Japan | 6-244112 |

[51] Int. Cl.$^6$ .................... B23K 26/02

[52] U.S. Cl. .................... 219/121.62; 219/121.72; 219/121.76; 219/121.83

[58] Field of Search .................... 219/121.6, 121.61, 219/121.62, 121.67, 121.68, 121.69, 121.72, 121.73, 121.74, 121.75, 121.76, 121.77, 121.8, 121.82, 121.83, 121.78

[56] References Cited

U.S. PATENT DOCUMENTS

| | | | |
|---|---|---|---|
| 3,634,646 | 1/1972 | Berger | 219/121.67 |
| 4,745,289 | 5/1988 | Mashima . | |
| 4,769,523 | 9/1988 | Tanimoto et al. | 219/121.6 |
| 5,038,016 | 8/1991 | Robertson et al. | 219/121.83 |
| 5,173,584 | 12/1992 | Kahlert et al. | 219/121.83 |
| 5,340,975 | 8/1994 | Vogelgesang | 219/121.62 |
| 5,463,202 | 10/1995 | Kurosawa et al. | 219/121.83 |

FOREIGN PATENT DOCUMENTS

| | | | |
|---|---|---|---|
| 4320408A1 | 12/1994 | Germany . | |
| 56-9090 | 1/1981 | Japan . | |
| 56-43838 | 10/1981 | Japan . | |
| 61-238489 | 10/1986 | Japan . | |
| 63-136546 | 6/1988 | Japan | 219/121.68 |
| 64-76720 | 3/1989 | Japan . | |
| 64-83390 | 3/1989 | Japan | 219/121.81 |
| 3-268456 | 11/1991 | Japan . | |
| 4-41092 | 2/1992 | Japan . | |
| 5-211260 | 8/1993 | Japan . | |
| 5-315381 | 11/1993 | Japan . | |
| 6-142968 | 5/1994 | Japan . | |

*Primary Examiner*—Teresa J. Walberg
*Assistant Examiner*—Gregory L. Mills
*Attorney, Agent, or Firm*—Fay,Sharpe,Beall, Fagan,Minnich & McKee

[57] ABSTRACT

Detecting light from a detecting light source (122) is irradiated to a workpiece (1) and the reflected light is detected by a photosensor (126). At the same time, light resulting from emission of plume produced upon laser processing is also detected by the photosensor (126). A laser controller (26) binary-codes a detection signal from the photosensor (126) to provide a rectangular wave signal (TP) and, based on the rectangular wave signal (TP), generates a trigger signal ($TP_2$) for oscillating a processing laser beam. At this time, the trigger signal ($TP_2$) is fed back to generate a gate signal (GP) and, based on the gate signal (GP), the detection signal resulted from the emission of the plume is omitted in the gate circuit (245) to produce a trigger signal ($TP_G$). This trigger signal ($TP_G$) is given with a delay time ($T_D$) to produce a trigger signal ($TP_1$). The above trigger signal ($TP_2$) is generated in synch with the trigger signal ($TP_1$). As a result, the laser processing is prevented from being applied unnecessarily based on the light generated upon the laser processing.

28 Claims, 15 Drawing Sheets

DETECTION SIGNAL FROM PHOTOSENSOR 126
COMPARATOR
241
TP
TRIGGER SIGNAL GENERATOR
242
TPs
TPN
GATE CIRCUIT
245
GP
TPG
DELAY CIRCUIT
243
TD SETTING COMMAND FROM MAIN CONTROLLER 23
GATE SIGNAL GENERATOR
244
TP1
OUTPUT TO LASER CONTROLLER 26
TP2
INPUT FROM LASER CONTROLLER 26
24

TD SETTING COMMAND FROM MAIN CONTROLLER 23
CENTRAL PROCESSING UNIT (CPU)
242a
TP1
OUTPUT TO LASER CONTROLLER 26
TP
COMPARATOR
241
24a
DETECTION SIGNAL FROM PHOTOSENSOR 126

LASER PROCESSING APPARATUS, LASER PROCESSING METHOD AND DAM BAR PROCESSING METHOD

TECHNICAL FIELD

The present invention relates to a laser processing apparatus and a laser processing method by which a workpiece can be processed in the desired processed positions at high speed, as well as a dam bar processing method using the laser processing apparatus.

BACKGROUND ART

Pulse-like laser beams are utilized as one processing method to perform cutting, punching, welding, etc. in manufacturing processes ranging over a variety of fields including, e.g., mechanical, electronic, and semiconductor apparatus. Arrangements of a conventional laser processing apparatus will briefly be described below.

A conventional laser processing apparatus includes a laser oscillator comprising a laser head, a laser power supply, etc., a processing optical system, an XY-table mounting a workpiece thereon and being movable in a horizontal plane (XY-plane), a controller for controlling the movement of the XY-table and the oscillation of the laser oscillator in an automatic or manual manner, and so on.

In the laser power supply, a supplied AC current is converted into a DC current in accordance with a voltage value commanded from the controller, and is supplied to a capacitor. Electric charges accumulated in the capacitor are then discharged to an excitation lamp of the laser head in accordance with the predetermined on/off timing (pulse width and pulse frequency). In response to the discharge, a pulse-like laser beam is oscillated from the laser head.

The laser head incorporates a beam shutter which is opened and closed to switch the pulse-like laser beam on/off to thereby control irradiation of the laser beam to the workpiece. Specifically, when the workpiece is to be processed, the beam shutter is opened and, when the workpiece is not to be processed, the beam shutter is closed. The time during which the beam shutter is operated to open and close is on the order of 100 to 300 msec.

Let assume the case in which dam bars of an IC package, for example, are removed (cut off) by using the laser processing apparatus described above. Dam bars are positioned to interconnect pins (leads) of a lead frame for use with an IC package, and serves to not only dam a resin applied for integral sealing of the IC package by resin molding, but also reinforce the pins of the lead frame. The dam bars are removed after the integral sealing of the IC package by resin molding. The processing steps of removing the dam bars by utilizing a pulse-like laser beam will be described below in connection with the case that one dam bar in some point has been removed (cut off) and another dam bar in a next point is now removed.

(1) The irradiated position of the laser beam onto the workpiece is moved toward the next point by the XY-table.

(2) The XY-table is positioned at the point of step (1) and stopped there.

(3) The beam shutter is opened.

(4) The laser beam is irradiated to remove the dam bar in the point of step (1).

(5) The beam shutter is closed.

By repeating the above processing steps from (1) to (5), the dam bars in four sides of the IC package are removed successively. At this time, the operation of the XY-table to move and stop and the operation of the beam shutter to open and close are implemented in accordance with programs stored in the controller beforehand. Also, during the above steps, the laser beam is continuously oscillated in the form of pulses at all times, or oscillated in synchronism with the opening of the beam shutter.

Additionally, the prior art relating to a laser processing apparatus or a laser processing method suitable for the above case of removing dam bars is described in, e.g., JP, A, 56-9090 or JP, A, 4-41092. In the method described in the former JP, A, 56-9090, a laser beam is evenly irradiated to a workpiece by oscillating the laser beam in accordance with change in the processing speed (i.e., the moving speed of an XY-table). In the apparatus described in the latter JP, A, 4-41092, the on/off timing and the irradiation timing of a laser beam are controlled in accordance with results of comparison between information about a plurality of processed positions stored beforehand and amounts of movement of an XY-table.

DISCLOSURE OF THE INVENTION

Since dam bars of usual IC packages are dimensioned to have a width of about 0.1 to 0.3 mm and a thickness of about 0.15 mm, each dam bar can sufficiently be removed by one pulse of a laser beam. Therefore, the time required for actual processing corresponds to the time of pulse width of the laser beam, and hence is on the order of 0.1 to 1 msec. With the processing method following the above steps (1) to (5), however, the time of about 1 sec is spent to remove one dam bar because of the time required to open and close the beam shutter that ranges from 200 to 600 msec plus the time required to move the table. This means that the processing time is too long in view of the number of dam bars to be cut off and the number of IC packages to be manufactured.

Generally, the pitch of pins of lead frames is uniform in many cases. But, for the reason of pins deforming due to manufacture errors of the lead frames, distortion caused by the temperature hysteresis when integral sealing of IC packages is performed by resin molding, and external forces applied during handling of the lead frames, the pitch of pins is sometimes not uniform at the time of removing dam bars. Since the first-mentioned dam bar removing method is arranged to register, in programs beforehand, the locations where dam bars are to be removed, it is not adaptable for the above case in which the pitch of pins is not uniform. Further, in the worst case that manufacture errors and deformations are accumulated so as to exaggerate dimensional errors, there is a possibility that the pins of the lead frames to be left may be damaged.

When the prior art described in JP, A, 56-9090 is employed to the removal of dam bars, a laser beam is controlled to be evenly irradiated to a workpiece and, therefore, the prior art is not adaptable for the case in which the pitch of pins is not uniform and the array of pins is not regular, resulting in the similar problem as explained above. Further, when the prior art described in JP, A, 4-41092 is employed to removal of dam bars, a laser beam can only be controlled to follow a predetermined shape that is stored (estimated) beforehand and, therefore, the prior art is also not adaptable for the case in which the array of pins is not regular, resulting in the similar problem as explained above.

Taking into account the above problem, the applicant has previously invented a pulse laser processing machine and a pulse laser processing method (JP, A, 6-142968 filed Oct. 30, 1992), the machine comprising detecting means for detecting the presence or absence of a workpiece material in the processed position and generating a corresponding detection signal, rectangular wave signal generating means for generating a rectangular wave signal based on the detection signal, and control means for controlling oscillation of a pulse laser beam so that the pulse laser beam is irradiated at the timing based on the rectangular wave signal. With this art, the workpiece material can be processed in the desired processed positions at high speed for not only the case in which the processed positions are spaced from one another with equal intervals, but also the case in which the processed positions are not spaced from one another with equal intervals.

However, it has been found that the above art still has a room for further improvement because light emitted upon the laser processing may be detected by mistake as the reflected light or the transmitted light to be detected depending on whether the workpiece material is present or absent.

More specifically, when a laser beam is irradiated to a workpiece to process the same, light is emitted from the processed positions each time the laser processing is carried out on the workpiece. The emitted light is attributable to plasma and oxidative reaction, and is called plume. Therefore, the light detected by the detecting means consists of two kinds of light; i.e., the reflected light or the transmitted light of detecting light reflected by or transmitted through the workpiece and the light emitted upon the laser processing (hereinafter also referred to simply as plume). Accordingly, when the rectangular wave signal generating means generates a rectangular wave signal based on the detection signal, there arises no problem if the level (the intensity of light) of the plume is smaller than a predetermined threshold. But if the level of the plume is in excess of the predetermined threshold, the rectangular wave signal output from the rectangular wave signal generating means includes a signal representative of the level of the plume as well, and hence the plume is detected by mistake as the reflected light or the transmitted light produced depending on the presence or absence of the workpiece material. In response to the signal thus detected by mistake, a laser beam is also oscillated. As a result, there is a drawback in that the laser processing is performed on the workpiece in a false position other than the predetermined position where the workpiece is to be processed.

An object of the present invention is to provide a laser processing apparatus and a laser processing method by which a workpiece can be processed in the desired processed positions at high speed for not only the case in which the processed positions are spaced from one another with equal intervals, but also the case in which the processed positions are not spaced from one another with equal intervals, and by which the presence or absence of a workpiece material can be detected accurately and reliably so that the workpiece will not unnecessarily be subjected to laser processing based on light emitted upon the laser processing.

To achieve the above object, according to the present invention, there is provided a laser processing apparatus comprising a laser oscillator for oscillating a pulse-like processing laser beam, a processing optical system for introducing the processing laser beam to a processed position of a workpiece, and carrying means for moving the workpiece and determining the processed position of the workpiece, wherein the apparatus further comprises a detecting light source for generating detecting light to detect the presence or absence of the workpiece in the processed position, detecting means for detecting light from the processed position and generating a detection signal corresponding to the detected light, process light removing means for, from the detection signal, omitting a detection signal resulted from light generated upon laser processing and taking out a detection signal resulting from reflected light or transmitted light of the detecting light, and control means for controlling the oscillation of the processing laser beam based on the detection signal resulted from the reflected light or the transmitted light of the detecting light from the processed position so that the processing laser beam is irradiated to the predetermined processed position of the workpiece.

In the present invention arranged as set forth above, the detecting light to detect the presence or absence of the workpiece in the processed position is generated from the detecting light source, and the light from the processed position is detected by the detecting means to generate a detection signal corresponding to the detected light. At this time, the detecting means detects, in addition to the reflected light or the transmitted light of the detecting light from the processed position, the light generated upon the laser processing as well. Therefore, the process light removing means omits, from the detection signal, the detection signal resulting from the light generated upon laser processing to take out only the detection signal resulting from reflected light or transmitted light of the detecting light, the taken-out detection signal being input to the control means. The control means controls the oscillation of the processing laser beam based on only the detection signal resulting from the reflected light or the transmitted light of the detecting light so that the processing laser beam is reliably irradiated to the desired processed position to process the workpiece on the basis of information about the workpiece surface. Accordingly, the processing laser beam will not be oscillated based on the detection signal resulted from the light generated upon the laser processing, and hence is prevented from being irradiated unnecessarily to false positions other than the preset processed positions. Further, since the processing laser beam is irradiated to the position spaced by a certain distance from the position in which the information about the presence or absence of the workpiece is detected, the workpiece can reliably be processed at high speed in the desired positions to be cut off in accordance with the information about the presence or absence of the workpiece.

In the above laser processing apparatus, preferably, the process light removing means comprises gate signal generating means for generating a gate signal having a predetermined gate width at the same time as the oscillation of the processing laser beam, and gating means for allowing the detection signal to be input to the control means when the gate signal is switched off, but preventing the detection signal from being input to the control means when the gate signal is switched on. With this arrangement, only the detection signal resulted from the detecting light can be taken out and input to the control means, and a pulse-like processing laser beam can be oscillated based on only the detecting light through the subsequent signal processing.

Also, the above process light removing means preferably comprises rectangular wave signal generating means for binary-coding the detection signal from the detecting means by using, as a threshold, a value that is higher than a level of the detection signal resulted from the light generated upon the laser processing, and applying a binary-coded signal to the control means. With this arrangement, the detection signal resulted from the emission of the plume is omitted by the rectangular wave signal generating means, while only the rectangular wave signal based on the detecting light is output from the rectangular wave signal generating means and input to the control means. Accordingly, a pulse-like processing laser beam can be oscillated based on only the detecting light through the subsequent signal processing.

Further, the above process light removing means preferably comprises signal processing means for taking in pulses of the detection signal from the detecting means alternately and applying the taken-in pulses to the control means. The detection signal based on the detecting light and the detection signal resulted from the emission of the plume are output alternately. Therefore, by taking in pulses of the detection signal from the detecting means alternately and applying the taken-in pulses to the control means, it is possible to omit the signal resulting from the emission of the plume and to oscillate a pulse-like processing laser beam by utilizing only the signal based on the detecting light through the subsequent signal processing.

Meanwhile, according to the prior art disclosed in the above-cited JP, A, 6-142968, it is desired to detect the presence or absence of the material of a workpiece to be processed by impinging illumination light from illumination light generating means to the workpiece and detecting reflected light or transmitted light of the illumination light from the workpiece surface by optical detecting means. The illumination light irradiates the workpiece over a certain area, but has the brightness not always even in the illuminated area and fluctuated constantly, and includes some noise. It is therefore often difficult to accurately detect the illumination light. Also, in the above disclosed prior art, a light of the predetermined position in an image of the illumination light focused on a target is detected by a photosensor to thereby detect the presence or absence of the workpiece material. However, the use of a photosensor for detecting the illumination light poses a limit in the size of a window formed in the target, and the window is required to have a considerable size. Accordingly, the state of the workpiece is detected based on light from the area having a corresponding considerable size, and hence rising of a detection signal used for detecting the presence or absence of the workpiece material becomes so slow as to raise a difficulty in detecting the presence or absence of the workpiece material with high resolution. In addition, the difference between bright and dark levels of the reflected light detected by the photosensor depending on the presence or absence of the workpiece material in the vicinity of the processed position is so small that the detection signal based on the reflected light may be buried in fluctuations in the brightness of the detecting light, electrical noise caused by circuits, or the like. Consequently, highly accurate detection cannot be achieved.

By contrast, in the present invention, the above detecting light source is a detecting laser beam source for irradiating a detecting laser beam to a detected position near the processed position. Thus, since a laser beam which can be condensed into a very small spot diameter and has a stable output subjected to less time-dependent fluctuations, is used as the detecting light to detect the presence or absence of the workpiece in the detected position near the processed position, rising (response) of the signal in detecting the presence or absence of the workpiece is so sped up that the presence or absence of the workpiece can be detected reliably and accurately with high resolution. Further, since the detecting light can be of monochromatic light, chromatic aberration of the optical parts is eliminated and hence the detecting light can reliably be detected by the detecting means even with a simple optical system. Of course, it is needless to say that the laser beam for use as the detecting light, i.e., the detecting laser beam, is different from the processing laser beam for use in the laser processing. If the detecting laser beam is produced by a semiconductor laser, for example, the service life of the detecting light source can be prolonged.

In that case, the above process light removing means preferably includes an optical filter allowing light having the exactly and nearly same wavelength as the detecting laser beam to pass therethrough. With this arrangement, the detecting laser beam to be taken in can selectively be taken in through the optical filter while omitting other light, and the detection accuracy can be further improved.

Preferably, the above laser processing apparatus further comprises detected position shifting means for changing the relative location of the detected position by the detecting laser beam with respect to the irradiated position of the processing laser beam on the workpiece. With this arrangement, the relative location of the detected position by the detecting laser beam with respect to the irradiated position of the processing laser beam can optionally be changed on the workpiece by using the detected position shifting means. Therefore, the detected position by the detecting laser beam can optionally be changed depending on the size and configuration of the workpiece without any troublesome operation, making it possible to set the optimum detected position.

As the detected position shifting means, it is preferable to employ a reflecting mirror being tiltable about each of two axes orthogonal to each other in a reflecting surface thereof and allowing the light from the detected position to enter the detecting means. With this arrangement, the incident angle of the detecting laser beam to the detected position can be varied, and hence the relative location of the detected position by the detecting laser beam with respect to the irradiated position of the processing laser beam can optionally be changed. In this case, the change in the incident angle of the detecting laser beam to the detected position upon adjustment of the reflecting mirror is made through biaxial control.

Also, as the above detected position shifting means, it is preferable to employ rotary wedge base plate means disposed between the detecting laser beam source and the workpiece, having a surface inclined with respect to an original optical axis of the detecting laser beam, and being rotatable about the original optical axis. In this case, the detecting laser beam having passed through the rotary wedge base plate means advances while inclining at a certain angle with respect to the original optical axis thereof. This certain angle depends on an inclination angle of the surface of the rotary wedge base plate means with respect to the original optical axis. Then, by rotating the rotary wedge base plate means about the original optical axis, the detected position on the workpiece by the detecting laser beam can be revolved by any desired angle on the circumference of a circle having a certain radius in the vicinity of the processed position. The relative location of the detected position by the detecting laser beam with respect to the irradiated position of the processing laser beam can thus be changed. In this case, the change in the incident angle of the detecting laser beam to the detected position upon adjustment of the rotary wedge base plate means is carried out through uniaxial control (in the circumferential direction of the above circular path).

Further, as the above detected position shifting means, it is preferable to employ image rotating prism means disposed between the detecting laser beam source and the workpiece, being variable in an angle of inclination with respect to an original optical axis of the detecting laser beam, and being rotatable about the original optical axis. With this arrangement, the detecting laser beam having passed through the image rotating prism means advances while inclining at a certain angle with respect to the original optical axis thereof. This certain angle depends on an inclination angle of the surface of the image rotating prism with respect to the original optical axis. Then, by setting the inclination angle of the image rotating prism means and, thereafter, rotating the image rotating prism means about the original optical axis while the inclination angle of the image rotating prism is kept at the set value, the detected position on the workpiece by the detecting laser beam can be revolved by any desired angle on the circumference of a circle having a certain radius in the vicinity of the processed position. Further, by changing the inclination angle of the image rotating prism means, an inclination angle of the path of the detecting laser beam having passed through the image rotating prism means is changed and hence the diameter of the circle along which the detected position of the detecting laser beam moves on the workpiece can be varied depending on the configuration of the workpiece. As a result, the relative location of the detected position by the detecting laser beam with respect to the irradiated position of the processing laser beam can be changed on the workpiece. In this case, the change in the incident angle of the detecting laser beam to the detected position upon adjustment of the image rotating prism means is carried out through uniaxial control (in the circumferential direction of the above circular path) made on condition that the other axis (corresponding to the radial direction of the above circular path) is held fixed.

In the above laser processing apparatus, preferably, the processing optical system includes a condensing lens for condensing the processing laser beam to the processed position, the condensing lens allowing the detecting light as well to pass therethrough and introducing the detecting light onto the workpiece. Thus, the condensing lens for condensing the processing laser beam doubles as the condensing lens for introducing the detecting light. As a result, the arrangements of the apparatus become simple and the adjustment of the optical system including the condensing lens is facilitated.

In addition, the above laser processing apparatus of the present invention makes it possible to carry out a laser processing method comprising the steps of moving a workpiece and determining a processed position of the workpiece, irradiating a pulse-like processing laser beam from a laser oscillator to the processed position, and processing the workpiece, wherein detecting light to detect the presence or absence of the workpiece in the processed position is irradiated to the processed position, light generated upon laser processing is omitted from light from the processed position and only reflected light or transmitted light of the detecting light from the processed position is taken out of the light from the processed position, and the processing laser beam is irradiated to the predetermined processed position of the workpiece at the timing based on a detection signal resulted from the reflected light or the transmitted light of the detecting light from the processed position.

In the above laser processing method, preferably, a detecting laser beam is used as the detecting light, and the detecting laser beam is irradiated to a detected position in the vicinity of the processed position.

Further, the above laser processing apparatus of the present invention makes it possible to carry out a dam bar processing method of the present invention for cutting off dam bars of an IC package of the structure that a semiconductor chip is mounted on a lead frame and the assembly is integrally sealed off by resin molding.

BEST MODE FOR CARRYING OUT THE INVENTION

Embodiments of a laser processing apparatus, a laser processing method, and a dam bar processing method of the present invention will be described below with reference to the drawings.

First Embodiment

A first embodiment of the present invention will be described with reference to FIGS. 1 to 7. Note that, in the following, a description will be made of mainly the process of removing dam bars of an IC package having pins spaced from one another with equal intervals.

Figure 1:
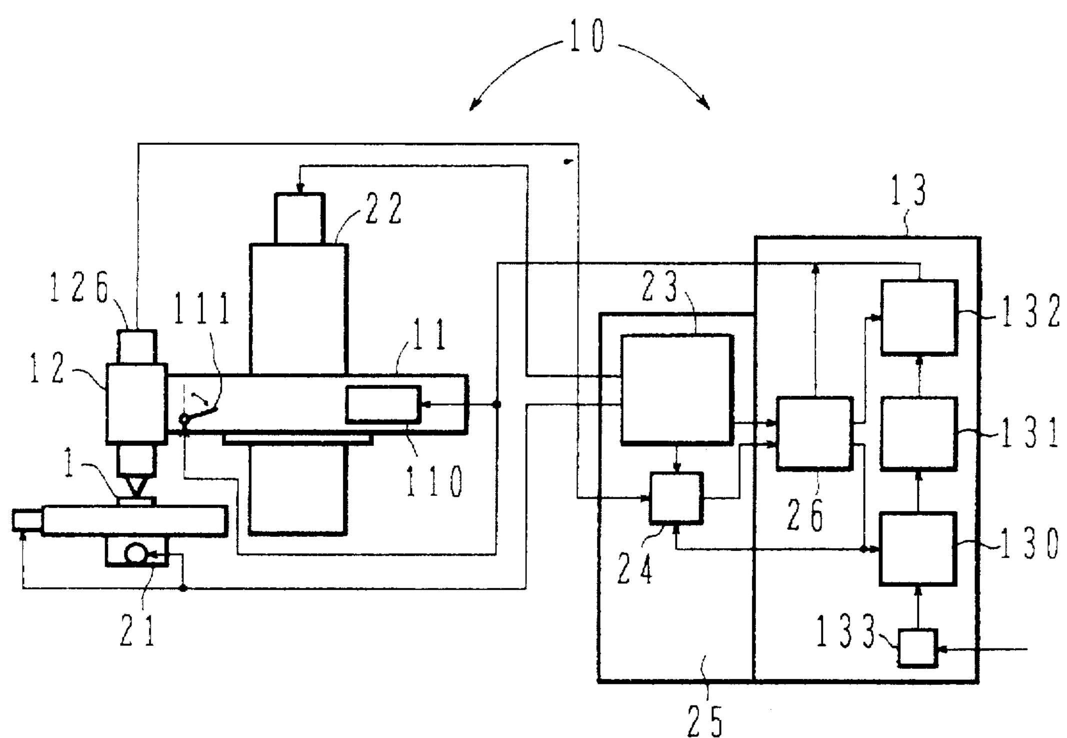
FIG. 1 is a block diagram for explaining a first embodiment of the present invention, the diagram showing arrangements of a laser processing apparatus.

As shown in FIG. 1, a laser processing apparatus of this embodiment comprises a laser oscillator 10 consisted of a laser head 11 and a laser power supply 13, a working head 12, an XY-table 21 as carrier means for mounting an object to be processed (hereinafter referred to as a workpiece) 1 thereon and being movable in a horizontal plane (XY-plane), a Z-table 22 for moving the laser head 11 and the working head 12 vertically (in the Z-axis direction), and a control unit 25 including a main controller 23 and a trigger unit 24. The main controller 23 automatically controls the operation of the XY-table 21 to move in the horizontal plane, the operation of the Z-table 22 to move in the vertical direction, and the operation of the laser oscillator 10 to oscillate.

The laser power supply 13 comprises a stabilized power supply 130, a capacitor 131, a switch 132, an AC power supply 133, and a laser controller 26. In the laser power supply 13, an alternating current supplied from the AC power supply 133 is first supplied to the stabilized power supply 130 where the alternating current is converted into a direct current in accordance with a voltage value commanded from the laser controller 26. The direct current is then supplied to the capacitor 131. Electric charges supplied to the capacitor 131 in accordance with the commanded voltage value are supplied to an excitation lamp 110 disposed in the laser head 11 upon the switch 132 being opened and closed in response to a trigger signal $TP_2$ (described later) from the laser controller 26. This supply of the electric charges in the pulse form causes the excitation lamp 110 to emit light, by which a laser medium (not shown) is excited to radiate a pulse-like processing laser beam.

Also, the laser head 11 shown in FIG. 1 incorporates a beam shutter 111. The beam shutter 111 is opened and closed to switch on/off the pulse-like processing laser beam emitted from the laser oscillator 10 to thereby control irradiation of the pulse-like processing laser beam to the workpiece 1. Specifically, when the workpiece 1 is to be processed, the beam shutter 111 is made open and, when the workpiece 1 is not to be processed, the beam shutter 111 is closed. The time during which the beam shutter is operated to open and close is on the order of 100 to 300 msec. The on/off control of the beam shutter 111 is made from the laser controller 26 in the illustrated embodiment, but may be made from the main controller 23 through the laser controller 26.

Figure 2:
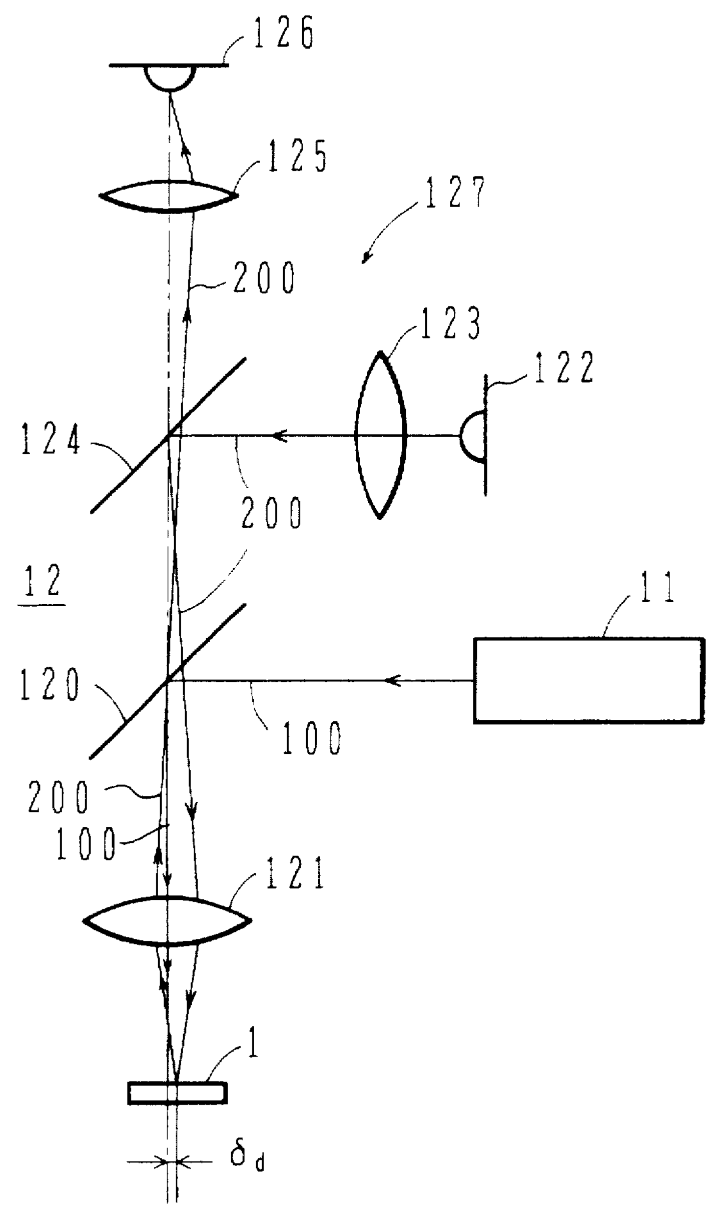
FIG. 2 is a schematic view of arrangements of a working head and a detecting optical system in FIG. 1.

Within the working head 12, as shown in FIG. 2, there are disposed a bending mirror 120 which has a characteristic of high reflectivity for the wavelength of the processing laser beam and a condensing lens 121, as with the conventional laser processing apparatus. In addition to the above arrangements, this embodiment includes a detecting optical system 127 which comprises a detecting light source 122 for generating a laser beam as detecting light, a collimator lens 123, a half mirror 124, a focusing lens 125, and a photosensor 126. The detecting light source 122 is formed of a laser beam source such as a laser diode (semiconductor laser). The detecting optical system 127 is basically analogous to arrangements of the optical system of a light pick-up unit for reading a disk signal in a CD player. Of course, it is needless to say that the laser beam for use as the detecting light is different from the laser beam for use in the laser processing. Incidentally, the condensing lens 121 doubles as a component of the detecting optical system 127.

Figure 3:
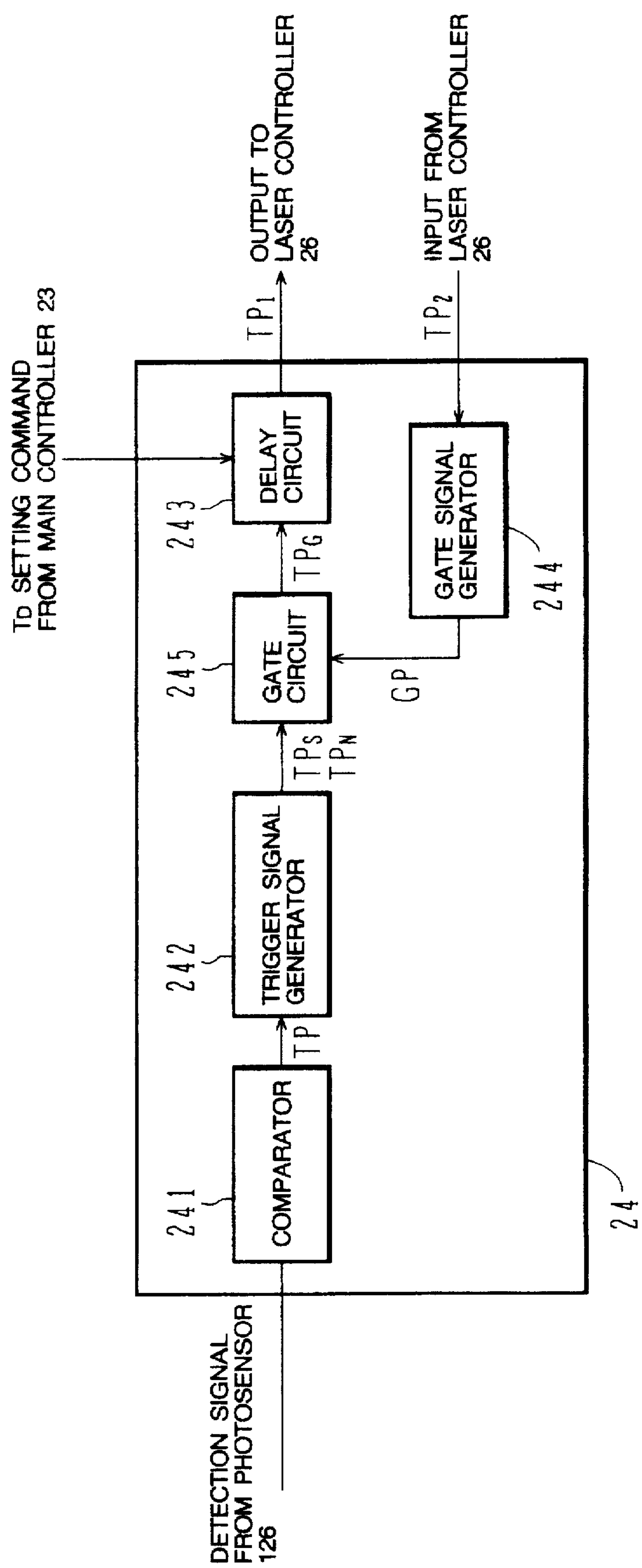
FIG. 3 is a block diagram showing arrangements of a trigger unit in FIG. 1.

Further, as shown in FIG. 3, the trigger unit 24 comprises a comparator 241, a trigger signal generator 242, a gate circuit 245, a delay circuit 243, and a gate signal generator 244. Of these components, the gate signal generator 244 serves as gate signal generating means and the gate circuit 245 serves as gating means, these two means cooperatively making up process light removing means. In the trigger unit 24, a detection signal from the photosensor 126 is supplied to the comparator 241 for binary coding with a certain threshold $V_{TH}$ as a reference to produce a rectangular wave signal TP. The trigger signal generator 242 outputs trigger signals $TP_S$, $TP_N$ (described later) in synchronism with falling of the rectangular wave signal TP, the trigger signals $TP_S$, $TP_N$ being applied to the gate circuit 245. On the other hand, the gate signal generator 244 receives a trigger signal $TP_2$ (described later) from the trigger circuit 262 in the laser controller 26, and outputs a gate signal GP (which takes a value of 1 when it is switched on, and a value of 0 when it is switched off) with a predetermined gate width $W_G$ to the gate circuit 245 in synch with rising of the trigger signal $TP_2$. When the gate signal GP from the gate signal generator 244 is switched off (=0), the gate circuit 245 outputs the trigger signal TPG in synch with rising of the trigger signal applied from the trigger signal generator 242. When the gate signal GP is switched on (=1), the gate circuit 245 outputs no signal even if the trigger signal is applied thereto from the trigger signal generator 242. Then, the trigger signal $TP_G$ is input to the delay circuit 243 where it is given with a delay time $T_D$ commanded from the main controller 23, and the delayed signal is output as $TP_1$ to the laser controller 26.

Figure 4:
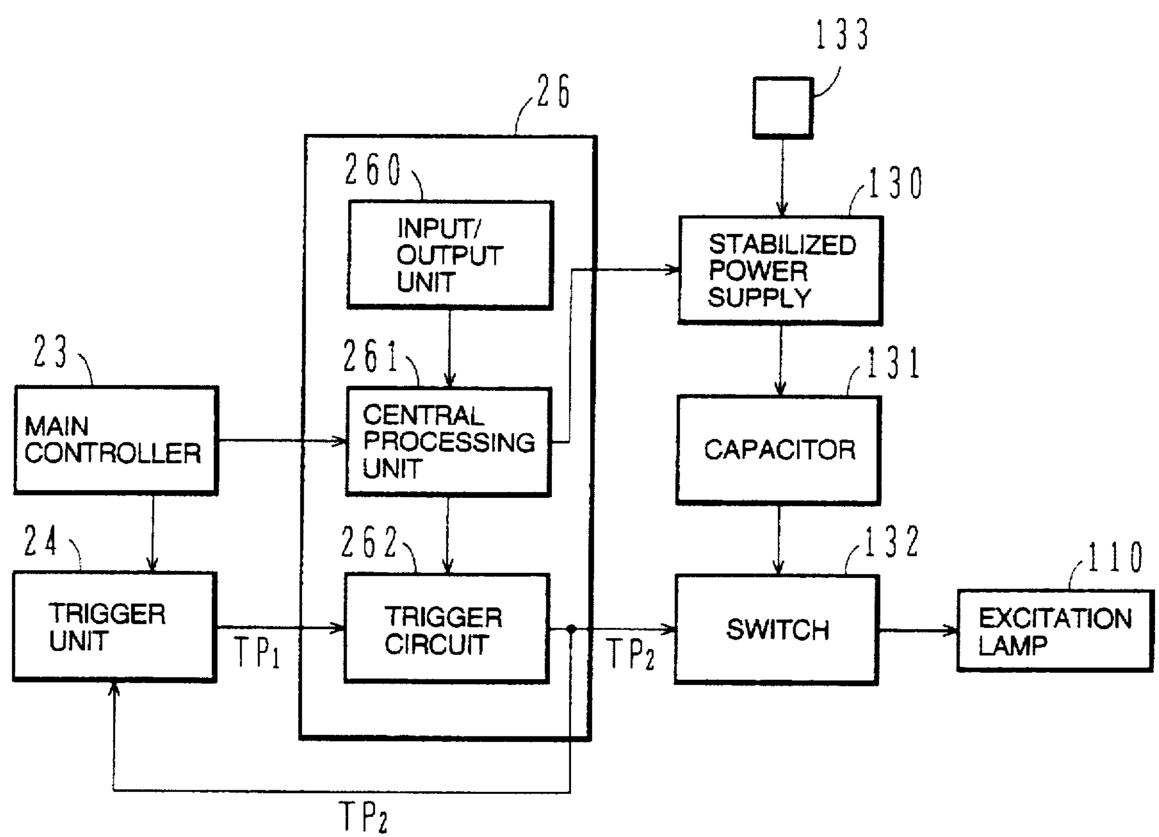
FIG. 4 is a block diagram showing arrangements of a laser controller and peripheral circuits thereof in FIG. 1.

As shown in FIG. 4, the laser controller 26 comprises an input/output unit 260, a central processing unit 261, and a trigger circuit 262. In synch with rising of the trigger signal $TP_1$ from the trigger unit 24, the trigger circuit 262 generates the trigger signal $TP_2$ with a pulse width commanded from the main controller 23 to the central processing unit 261, the trigger signal $TP_2$ being input to the switch 132. Further, the voltage value of the electric charges supplied to the capacitor 131 is applied through the input/-output unit 260 to the central processing unit 261 from which the voltage value is commanded to the stabilized power supply 130. After that, the processing laser beam is oscillated in accordance with the process explained above. On the other hand, the trigger signal $TP_2$ from the trigger circuit 262 is also applied to the gate signal generator 244 in the trigger unit 24 (see FIG. 3).

Returning to FIG. 2, the functions of the working head 12 and the detecting optical system 127 will now be described. A processing laser beam 100 oscillated from the laser head 11 is changed in its direction of propagation by the bending mirror 120 and then condensed by the condensing lens 121 for irradiation to the workpiece 1. Also, detecting light 200 emitted from the detecting light source 122 is converted into parallel light by the collimator lens 123. The parallel light is reflected by the half mirror 124, passes through the bending mirror 120, and is then focused by the condensing lens 121 into a small spot on the workpiece 1. In this connection, by adjusting the angle of inclination of the half mirror 124 in the detecting optical system 127, the small spot is focused at a position apart by a distance of $\delta_d$ from the condensed position of the processing laser beam 100 oscillated from the laser head 11. Then, the detecting light 200 reflected by the surface of the workpiece 1 passes through the condensing lens 121, the bending mirror 120 and the half mirror 124, and thereafter it is focused on the photosensor 126 by the focusing lens 125 so that information about the surface of the workpiece 1 is detected as an electric signal. In this embodiment, since a laser beam source is used as the detecting light source 122, a laser beam as the detecting light can be condensed into a very small spot by the collimator lens 123 and the condensing lens 121. As a result, when detecting information (the presence or absence of the material to be processed) about the surface of the workpiece 1, rising (response) of the detection signal is sped up and the reflected light can be detected with higher resolution.

Figure 5:
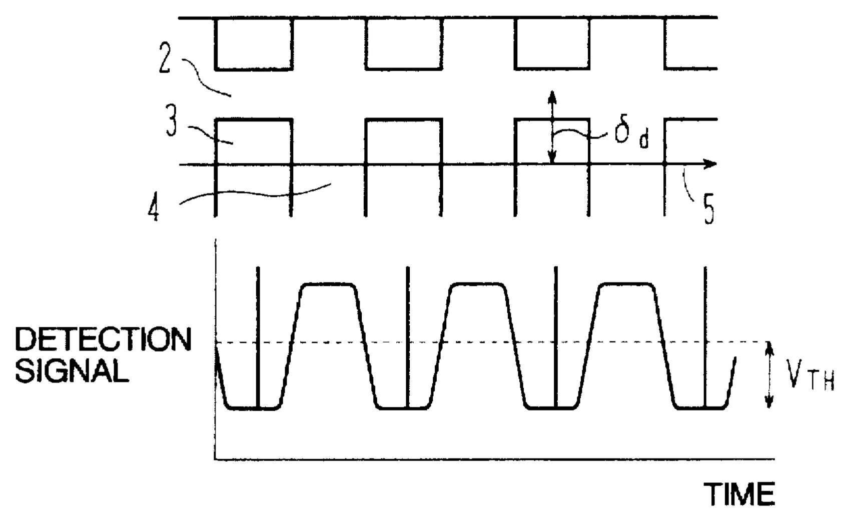
FIG. 5 is a chart showing the relationship between dam bars of a lead frame and a detection signal from a photosensor.

In the above arrangements, the condensing lens 121 and the focusing lens 125 are combined with each other so that an image of the spot of the detecting light 200 on the surface of the workpiece 1 is focused in the position of the photosensor 126. Also, as shown in FIG. 5, the distance of $\delta_d$ (see FIG. 2) between the spot and the condensed position of the processing laser beam 100 from the laser head 11 is determined so that the spot of the detecting light 200 impinges upon a portion of the workpiece which is a little outwardly of a dam bar 2. Assuming now that the dam bar 2 has a width of $W_{DB}$, the relationship of $\delta_d > W_{DB}/2$ is required to be met in order that the processing laser beam 100 is irradiated to nearly the center of the dam bar 2. By meeting the above relationship, the photosensor 126 can detect the presence or absence of a pin, i.e., can distinctly recognize a portion in which the pin exists (hereinafter referred to also as a web portion) 4 and a slit portion 3, while the processing laser beam 100 for use in the laser processing can be irradiated to nearly the center of the dam bar 2. Consequently, the dam bar 2 to be removed can be cut off based on the detection signal from the photosensor 126 as described later.

Figure 6:
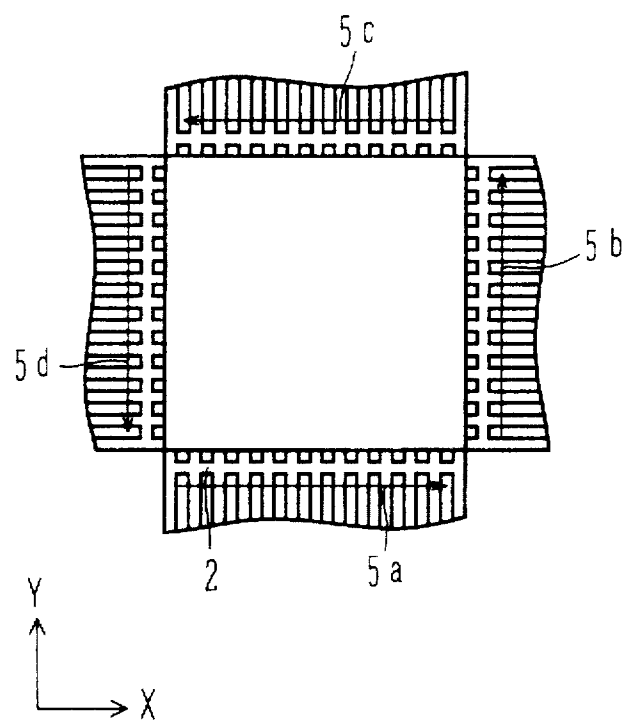
FIG. 6 is a view showing paths along which a laser beam is moved to cut off and remove dam bars in four sides of a QFP type IC package.

The operation of the laser processing apparatus thus arranged will be described. It is here assumed that, as shown in FIG. 6, dam bars 2 in four sides of a QFP type IC package are cut off and removed successively following, by way of example, paths 5*a* to 5*d* indicated in FIG. 6. Note that an X-axis and a Y-axis are defined as shown in FIG. 6.

First, when the workpiece 1 is moved by the XY-table 21 at a constant speed in the positive direction of the X-axis, the detecting light 200 condensed into a small spot is relatively moved on the workpiece 1 along the path 5*a* in FIG. 6. During this movement, those parts of the detection signal detected by the photosensor 126 which are attributable to the detecting light 200 from the detecting light source 122 change to have a high output corresponding to each of the web portions 4 and a low output corresponding to each of the slit portions 3. On this occasion, if the web portions 4 and the slit portions 3 of the workpiece 1 are arrayed with the same pitch, the detection signal resulting from the photosensor 126 while the XY-table is moving at a constant speed is produced to take the waveform having a constant period. If the web portions 4 and the slit portions 3 of the workpiece 1 are not arrayed with the same pitch, the detection signal from the photosensor 126 is produced to take the waveform that varies with respect to time in proportion to change in the pitch. Further, by moving the workpiece 1 in the positive direction of the Y-axis, the negative direction of the X-axis, and the negative direction of the Y-axis, the small spot of the detecting light 200 is relatively moved along the paths 5*b*, 5*c* and 5*d*, respectively, detection signals having the similar waveform as mentioned above are produced.

In this embodiment, as described later, the dam bars 2 are removed by irradiating the processing laser beam 100 to respective central portions of the dam bars 2. However, when a workpiece is processed by irradiating a laser beam to the workpiece, there occurs emission of light called plume attributable to plasma and oxidative reaction from each of processed positions. Accordingly, as shown in FIG. 5, the detection signal detected by the photosensor 126 has the waveform in which the waveform resulted from the plume is superposed over the waveform resulted from the reflected light of the detecting light corresponding to the alternative array of the web portions 4 and the slit portions 3. Note that since the emission time of the plume is very short and substantially the same as the irradiation time of the laser beam, the detection signal generated upon the emission of the plume is represented by a solid line in FIG. 5.

Figure 7:
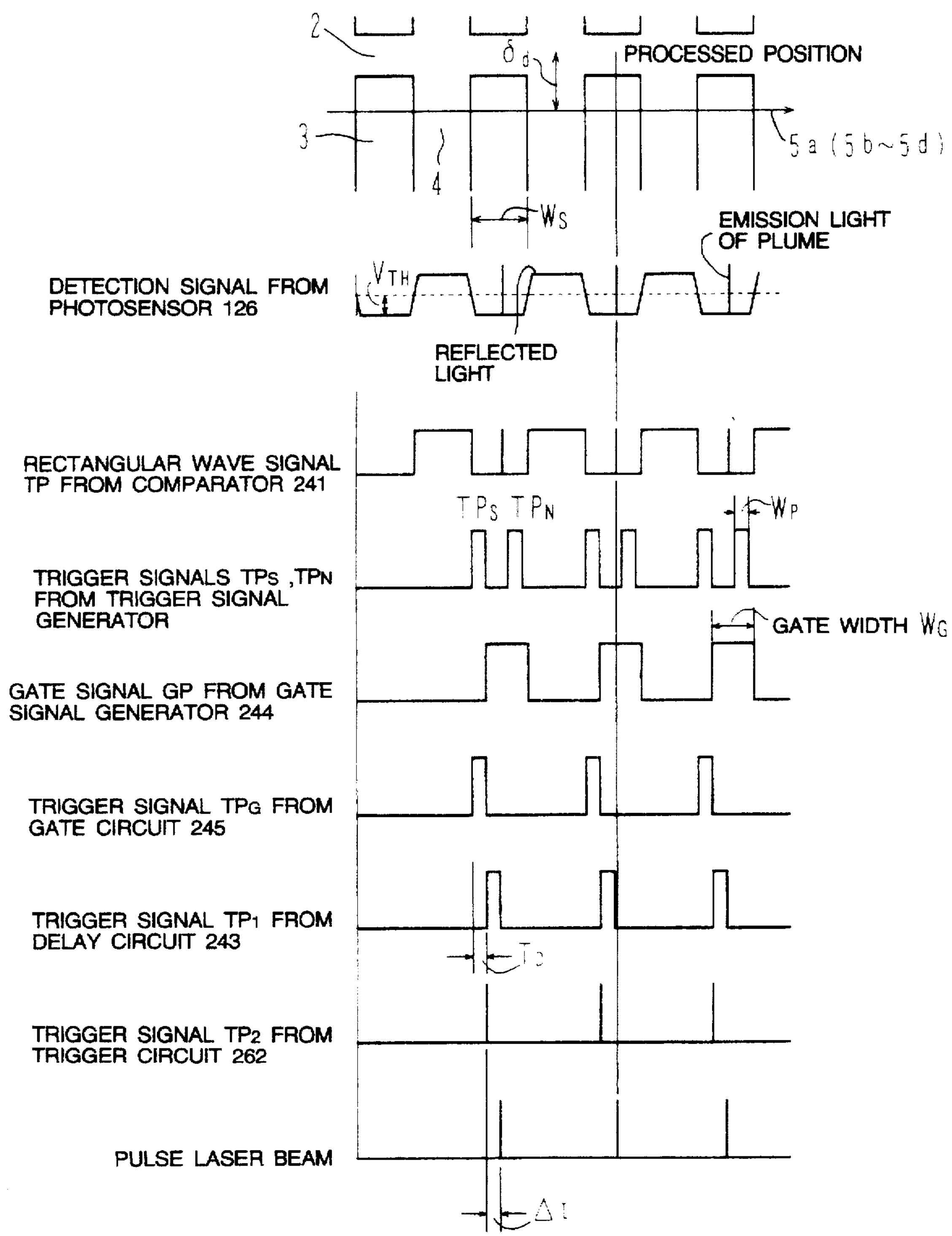
FIG. 7 is a time chart from outputting of the detection signal from the photosensor to oscillation of a processing laser beam.

Next, the detection signal from the photosensor 126 in which the waveform resulted from the plume is superposed over the waveform resulted from the reflected light of the detecting light is input to the trigger unit 24 where the input signal is binary-coded through the process shown in a time chart of FIG. 7. In FIG. 7, the web portions 4 and the slit portions 3 are also illustrated to alternately lie in the direction of the time base on an assumption that the workpiece 1 is moved at a constant speed. As an alternative, the detection signal from the photosensor 126 may be amplified by an amplifier before it is input to the trigger unit 24. The detection signal applied from the photosensor 126 to the comparator 241 of the trigger unit 24 is binary-coded with the certain threshold $V_{TH}$ indicated by a broken line in FIG. 7 as a reference to produce the rectangular wave signal TP which is then input to the trigger signal generator 242. At this time, if the level of the detection signal (the intensity of light) generated upon the emission of the plume is lower than $V_{TH}$, there arises no problem. But if the level of the detection signal generated upon the emission of the plume is higher than $V_{TH}$ as shown in FIG. 5, the comparator 241 also outputs the rectangular wave signal TP in response to the emission of the plume. The trigger signal generator 242 then outputs the trigger signals $TP_S$, $TP_N$ in synchronism with falling of the rectangular wave signal TP. Here, the trigger signal $TP_S$ is resulted from the reflected light of the detecting light and the trigger signal $TP_N$ is resulted from the emission of the plume. In this embodiment, the trigger unit 24 includes gate circuit 245 and the gate signal generator 244 to omit the signal resulted from the emission of the plume (i.e., the trigger signal $TP_N$).

The trigger signals $TP_S$, $TP_N$ are input to the gate circuit 245. As explained above, when the gate signal GP from the gate signal generator 244 is switched off (=0), the gate circuit 245 outputs the trigger signal $TP_G$ in synchronism with rising of the trigger signal applied from the trigger signal generator 242. When the gate signal GP is switched on (=1), the gate circuit 245 outputs no signal even if the trigger signal is applied thereto from the trigger signal generator 242. Then, the trigger signal $TP_G$ is input to the delay circuit 243 where it is given with a delay time $T_D$ commanded from the main controller 23, and the delayed signal is output as the trigger signal $TP_1$ to the laser controller 26.

Subsequently, in the laser controller 26, the trigger signal $TP_1$ is input to the trigger circuit 262 which in turn outputs the trigger signal $TP_2$ in synchronism with rising of the trigger signal $TP_1$. The pulse width of the trigger signal $TP_2$ is, as explained above, commanded from the main controller 23 through the central processing unit 261. The trigger signal $TP_2$ is then input to the switch 132 to turn on the switch 132 in synch with rising of the trigger signal $TP_2$, whereupon the electric charges are supplied from the capacitor 131 to the excitation lamp 110. After that, in synchronism with falling of the trigger signal $TP_2$, the switch 132 is turned off to stop the supply of electric charges to the excitation lamp 110. In such a manner, the pulse-like processing laser beam is oscillated in synchronism with the trigger signal $TP_2$. Note that the trigger signal $TP_2$ and the processing laser beam shown in FIG. 7 in fact exhibit the pulse waveform having a certain width, but they are each represented by a solid line in the drawing because of having the pulse width much shorter than that of the other signals.

Further, the trigger signal $TP_2$ is also input (fed back) to the gate signal generator 244 which in turn outputs the gate signal GP (having a predetermined gate width $W_G$) to the gate circuit 245 in synch with rising of the trigger signal $TP_2$. In other words, the gate signal GP is output at the same time as the generation of the trigger signal $TP_2$ for the oscillation of a laser beam. By generating the gate signal GP on the above condition and setting the gate width $W_G$ to a proper length, it is possible to switch the gate signal GP off (=0) when the trigger signal $TP_S$ is output from the trigger signal generator 242, but to switch the gate signal GP on (=1) when the trigger signal $TP_N$ resulting from the emission of the plume is output from the trigger signal generator 242. As a result, the trigger signal $TP_N$ is ignored in the gate circuit 245 and the trigger signal $TP_G$ in synchronism with rising of only the trigger signal $TP_S$ is output from the gate circuit 245. Specifically, it is only required for the gate circuit 245 to carry out the process of inverting the gate signal GP and taking the logical AND between the inverted signal and the trigger signal from the trigger signal generator 242. Also, it is required for the gate width $W_G$ of the gate signal GP to be set to meet the relationship of $W_G>\Delta t+W_P$, for example, on an assumption that the total delay time of a delay in the trigger circuit 262, a delay in the switch 132 and a delay until the laser oscillation is Δt, and the pulse width of the trigger signal $TP_S$ or $TP_N$ from the trigger signal generator 242 is $W_P$.

If the gate circuit 245 and the gate signal generator 244 were not included in the trigger unit 24, not only the trigger signal $TP_1$ output from the trigger signal generator 242, but also the trigger signal $TP_N$ resulted from the emission of the plume would be processed in a like manner, causing a pulse-like laser beam to be oscillated based on each of the trigger signal TPS and the trigger signal $TP_N$. In this case, the laser beam would be irradiated to not only the central portion of the dam bar 2 of interest, but also a position other than the dam bar 2 unnecessarily. Consequently, the desired laser processing could not be realized.

By contrast, in this embodiment, the trigger signal $TP_2$ for the oscillation of a laser beam is fed back to the gate signal generator 244 to generate the gate signal GP, and the trigger signal $TP_N$ resulted from the emission of the plume, which is generated from the trigger signal generator 242, is omitted in the gate circuit 245 by using the gate signal GP. Therefore, only the trigger signal $TP_S$ resulting from the detecting light is taken out and subjected to the subsequent signal processing so that only a pulse-like laser beam based on the trigger signal $TP_S$ is oscillated. Accordingly, the processing laser beam is reliably irradiated to each desired processed position to process the workpiece 1 on the basis of information about the surface of the workpiece 1, and is prevented from being irradiated unnecessarily to false positions other than the preset processed positions.

Alternatively, in FIG. 3, the gate circuit 245 may be disposed between the comparator 241 and the trigger signal generator 242. In this case, the rectangular wave signal TP from the comparator 241 is directly input to the gate circuit 245 for subsequent processing. Also, in this case, the gate width $W_G$ of the gate signal GP is set to be longer than at least the time from the start of rising of the trigger signal $TP_2$ to the end of emission of the plume. By so setting the gate width $W_G$ of the gate signal GP, even if the duration of the rectangular wave signal resulting from the emission of the plume is varied depending on change in the threshold $V_{TH}$, the rectangular wave signal resulted from the emission of the plume is always omitted by the gate circuit 245 and only the rectangular wave signal resulting from the detecting light is input to the trigger signal generator 242. After that, as explained above, the trigger signal from the trigger signal generator 242 is given with the delay time and the n supplied to the laser controller 26 which in turn generates the trigger signal for oscillating a laser beam.

A description will now be made of the delay time $T_D$ given by the delay circuit 243. Assuming that the moving speed of the workpiece 1 is v and the width of the slit portion 3 of the workpiece 1 is $W_S$, the time $T_1$ required for the processed position to move from the end of the slit portion 3 to the center thereof is expressed by:

$$T_1=W_S/2v \quad (1)$$

Also, the time $T_2$ from the entry of the processed position into the slit portion 3 to the irradiation of a laser beam to the workpiece is expressed below by using the delay time $T_D$ given by the delay circuit 243 and the above-mentioned delay time Δt:

$$T_2=\Delta t+T_D \quad (2)$$

Since the condition under which the laser beam is surely irradiated to the central portion of the dam bar is;

$$T_1=T_2 \quad (3)$$

the delay time $T_D$ to be set is given below from the above equations (1) to (3):

$$T_D=W_S/2v-\Delta t \quad (4)$$

Incidentally, the delay time Δt, the moving speed v of the workpiece 1, and the width $W_S$ of the slit portion 3 of the lead frame are entered in the main controller 23 beforehand.

The processing sequence of cutting off dam bars of IC which has dam bars in one side thereof, for example, by utilizing the above-mentioned operation will be described below. First, the path passing the dam bars, the focused position of spot of the detecting light (the set value of the distance $\delta_d$ from the end of the dam bar 2, the moving speed v of the XY-table 21, the width $W_S$ of the slit portion 3 of the workpiece 1, the delay time Δt, and the pulse width of the trigger signal $TP_2$ are entered in the main controller 23. Also, the pulse width $W_P$ of the trigger signal $TP_S$ or $TP_N$ generated by the trigger signal generator 242 and the gate width $W_G$ of the gate signal GP generated by the gate signal generator 244 are preset. Then, by moving the XY-table 21 at the constant speed v after setting the above data, a laser beam is oscillated at the period determined by the pitch of the slit portions 3 and the moving speed v of the table 21 while the signal resulting from the emission of the plume is omitted. The processing laser beam is irradiated corresponding to the center of each of the slit portions 3 to cut off the dam bars 2 successively. Therefore, the dam bars 2 are each cut off in a short time comparable to the oscillation period of the laser beam, enabling reliable and high-speed laser processing to be achieved.

With this embodiment explained above, since the trigger signal $TP_2$ for the oscillation of a laser beam is fed back to the gate signal generator 244 to generate the gate signal GP in synchronism with rising of the trigger signal $TP_2$ and the trigger signal $TP_N$ resulted from the emission of the plume, which is generated from the trigger signal generator 242, is omitted in the gate circuit 245 by using the gate signal GP, only the trigger signal $TP_S$ resulting from the detecting light is taken out and utilized so that a pulse-like laser beam can be oscillated based on only the trigger signal $TP_S$ resulting from the detecting light through the subsequent signal processing in the delay circuit 243 and the laser controller 26. Accordingly, the processing laser beam 100 is irradiated to each desired processed position (the center of the slit portion 3 when the pins are spaced from one another with equal intervals) to process the workpiece 1 on the basis of information about the surface of the workpiece 1, and is prevented from being irradiated unnecessarily to false positions other than the preset processed positions. Also, the dam bars can be each cut off in a short time comparable to the oscillation period of the laser beam that is determined by the pitch of the slit portions 3 and the moving speed v of the XY-table 21, as a result of which reliable and high-speed laser processing can be achieved. Further, since the processing laser beam 100 is irradiated to the position spaced by a certain distance from the end of the web portion 4, the workpiece 1 can reliably be processed at high speed in the desired positions to be cut off in accordance with the shape of the workpiece 1 for not only the case in which the pins are spaced from one another with equal intervals, but also the case in which the pins are not spaced from one another with equal intervals.

Moreover, since a laser beam source is used as the detecting light source 122, the detecting laser beam 200 from the light source can be condensed into a very small spot by the collimator lens 123 and the focusing lens 125. In addition, the detecting laser beam 200 has a stable output and is subjected to less time-dependent fluctuations. As a result, information (the presence or absence of the material to be processed) about the surface of the workpiece 1 can be detected with higher resolution, enabling the presence or absence of the material to be detected reliably and accurately. Further, since the detecting light can be of monochromatic light in that case, chromatic aberration of the optical parts is eliminated and hence the detecting light 200 can reliably be detected by the photosensor 126 even with a simple optical system. If the detecting light source 122 is formed of a semiconductor laser, for example, the service life of the light source can be prolonged.

When so high resolution is not required to detect the information (the presence or absence of the material to be processed) about the surface of the workpiece 1, the detecting light source 122 may be formed of an ordinary illumination light or the like rather than a laser beam source.

Second Embodiment

Next, a second embodiment of the present invention will be described with reference to FIG. 8.

Figure 8:
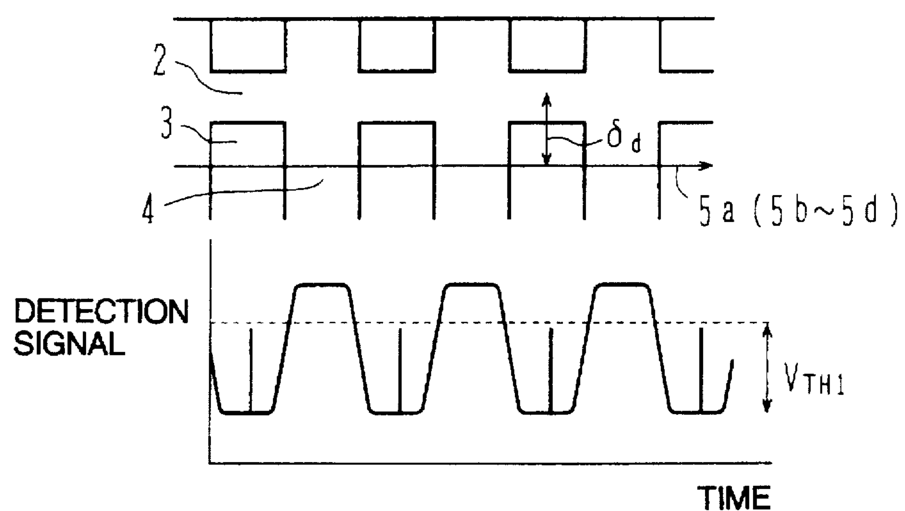
FIG. 8 is a block diagram for explaining a second embodiment of the present invention in which the level of the detection signal (the intensity of light) generated upon emission of the plume is lower than the level of the detection signal based on the reflected light of detecting light.

If the level of the detection signal (the intensity of light) generated upon the emission of the plume is lower than the level of the detection signal based on the reflected light of the detecting light, the detection signal attributable to the plume is omitted in the comparator 241 by setting the threshold of the comparator 241 to a value $V_{TH1}$ higher than the level of the detection signal attributable to the plume, as shown in FIG. 8. Thus, only the rectangular wave signal TP based on the reflected light of the detecting light is output from the comparator 241. In this case, therefore, the gate circuit 245 and the gate signal generator 244 can be dispensed with and the trigger signal $TP_2$ from the trigger circuit 262 is not required to be fed back to the same.

As a result, only the rectangular wave signal based on the reflected light of the detecting light is subjected to the subsequent signal processing so that the processing laser beam 100 is irradiated to each desired processed position to process the workpiece on the basis of information about the surface of the workpiece, and the laser processing is prevented from being performed unnecessarily in false positions other than the preset processed positions.

Third Embodiment

Next, a third embodiment of the present invention will be described with reference to FIG. 9.

Figure 9:
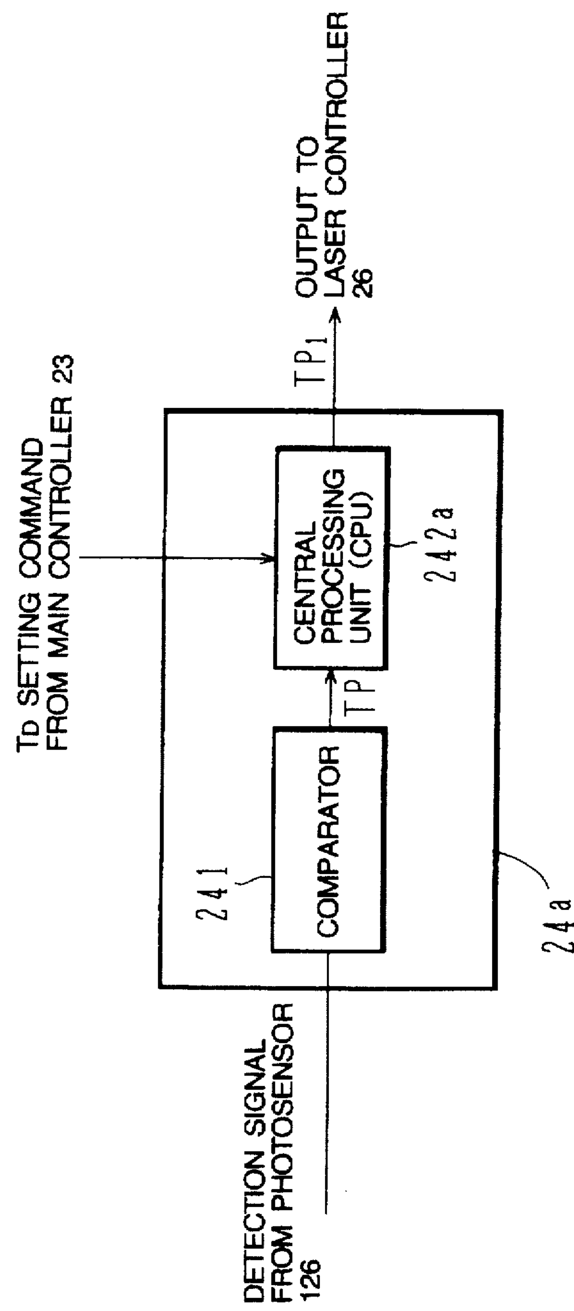
FIG. 9 is a block diagram for explaining a third embodiment of the present invention, the diagram showing arrangements of a trigger unit in the laser processing apparatus.

In this embodiment, as shown in FIG. 9, a trigger unit *24a* comprises the comparator 241 and a central processing unit (CPU) *242a*. The arrangements of this embodiment other than the trigger unit *24a* are the same as those of the first embodiment. The rectangular wave signals TP successively input from the comparator 241 are alternately taken in by the processing unit *242a*, and each of the taken-in rectangular wave signals TP is given with the delay time $T_D$ commanded from the main controller 23 to produce $TP_1$ which is output to the laser controller 26. The remaining alternate ones of the rectangular wave signals TP which have not been taken in by the processing unit *242a* are omitted.

Here, as described above in connection with FIG. 5, the rectangular wave signal based on the reflected light of the detecting light and the rectangular wave signal resulting from the emission of the plume are output alternately. By setting the processing unit *242a* to take in the rectangular wave signal based on the reflected light of the detecting light, therefore, the rectangular wave signal resulting from the emission of the plume can be omitted.

In this embodiment, the central processing unit (CPU) *242a* serves as both control means and signal selecting means of process light removing means. As an alternative, the processing unit *242a* may be constituted by utilizing a counter circuit.

Further, the processing unit *242a* may be arranged such that, after taking in one of the rectangular wave signals TP, it does not take in any rectangular wave signals TP for a predetermined period of time from then. This modification also makes it possible to take in the rectangular wave signals TP alternately and to omit the rectangular wave signals resulting from the emission of the plume. In this case, the above predetermined period of time is set to a value substantially equal to the gate width $W_G$ of the gate signal GP.

With this embodiment explained above, the detection signal attributable to the plume can be omitted with need of neither the gate circuit 245 nor the gate signal generator 244 shown in FIG. 3 and, therefore, the similar advantage as in the first embodiment can be provided.

Fourth Embodiment

Next, a fourth embodiment of the present invention will be described with reference to FIGS. 10 and 11.

This embodiment can also be applied to the case in which the intensity of light due to the emission of the plume is comparable to or greater than the intensity of the reflected light of the detecting light.

Figure 10:
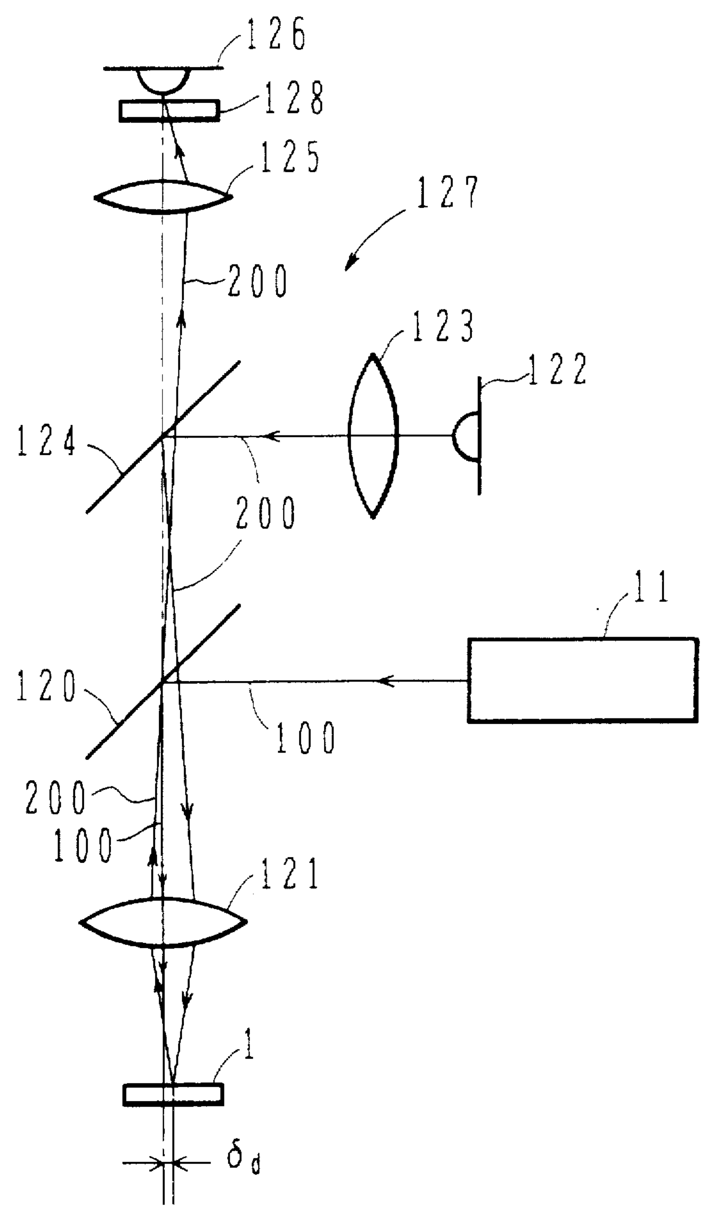
FIG. 10 is a block diagram for explaining a fourth embodiment of the present invention in which a band pass filter having a predetermined transmission band is set in the detecting optical system.

As shown in FIG. 10, a band pass filter (optical filter) 128 having a predetermined transmission band is disposed just before the photosensor 126 in the detecting optical system 127. The band pass filter 128 is selected to have its transmission band in a very narrow range including the wavelength of the detecting laser beam 200 oscillated from the detecting light source 122.

Figure 11:
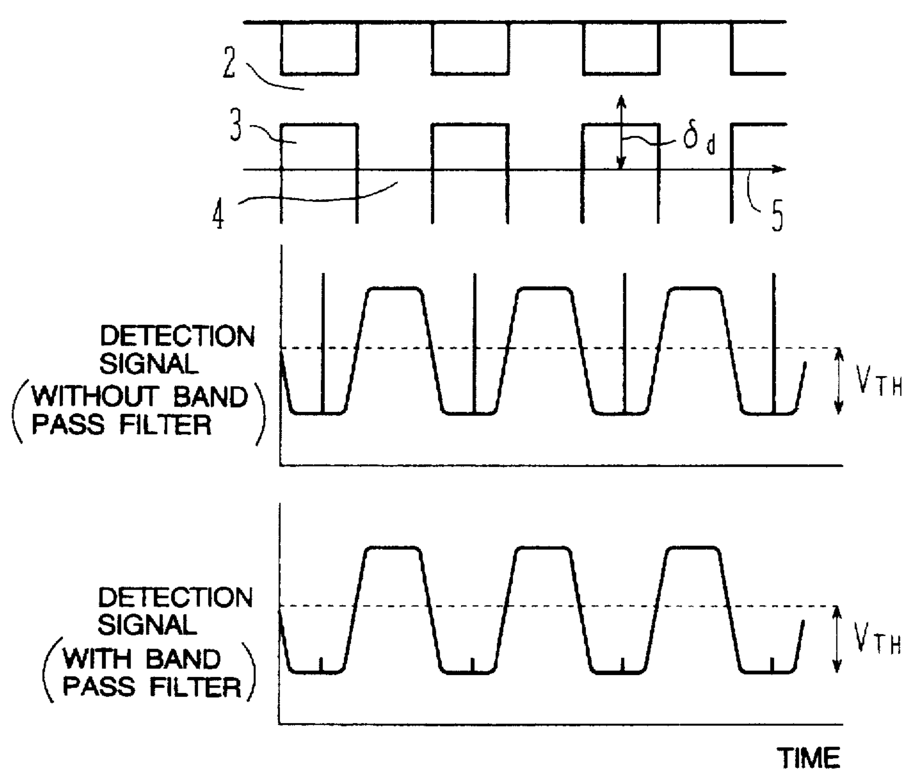
FIG. 11 is a chart for explaining the operating effect resulted by setting the band pass filter.

By thus restricting the wavelength band of the light reaching the photosensor 126, the intensity of light due to the emission of the plume can be reduced, as shown in FIG. 11, to thereby lower the level of the detection signal resulting from the emission of the plume that is detected by the photosensor 126. With this embodiment, the detection signal attributable to the plume can be omitted with need of neither the gate circuit 245 nor the gate signal generator 244 shown in FIG. 3 and, therefore, the similar advantage as in the second embodiment can be provided.

Also, since the detecting laser beam 200 of interest can selectively be taken in through the band pass filter 128, it is possible to omit light other than the detecting laser beam 200 (i.e., extraneous disturbing light) and to further improve the accuracy of detect ion.

Fifth Embodiment

Next, a fifth embodiment of the present invention will be described with reference to FIGS. 12 and 13.

Figure 12:
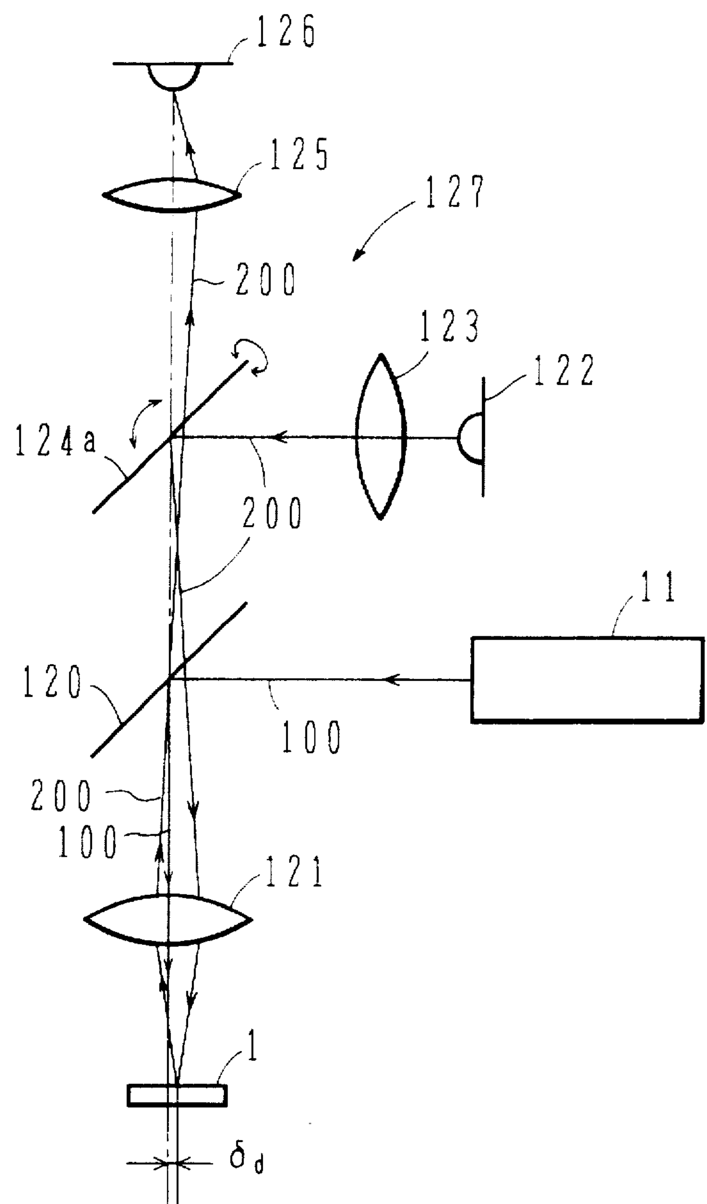
FIG. 12 is a view for explaining a fifth embodiment of the present invention, the view schematically showing arrangements of a working head and a detecting optical system.

As shown in FIG. 12, a laser processing apparatus of this embodiment employs a half mirror 124a different from the half mirror 124 in the first embodiment, and the remaining arrangements are the same as in the first embodiment. Also, in FIGS. 12 and 13, identical members to those in FIG. 2 are denoted by the same reference numerals.

The half mirror 124a serves as detected position shifting means and, as clearly shown in FIG. 3, the angle of its inclination is variable about each of two axes, i.e., an $X_1$-axis and a $Y_1$-axis, lying in the reflecting surface thereof and being orthogonal to each other. By changing the angle of inclination of the half mirror 124a, the incident angle of the detecting laser beam 200 toward the irradiated position, i.e., the detected position, on the workpiece 1 can be varied optionally. Such a change in the angle of inclination of the half mirror 124a is made by rotating the half mirror 124a about the $X_1$-axis and the $Y_1$-axis lying in the reflecting surface thereof and being orthogonal to each other, i.e., through biaxial control, in response to a command from the main controller 23.

As with the optical system shown in FIG. 2, the detecting light 200 emitted from the detecting light source 122 is converted into parallel light by the collimator lens 123. The parallel light is reflected by the half mirror 124a, passes through the bending mirror 120, and is then focused by the condensing lens 121 into a small spot on the workpiece 1. Here, in this embodiment, by adjusting the angle of inclination of the half mirror 124a as explained above, in the detecting optical system 127, the focused position of the spot can be varied to change the distance of $\delta_d$ from the condensed position of the processing laser beam 100.

Figure 13:
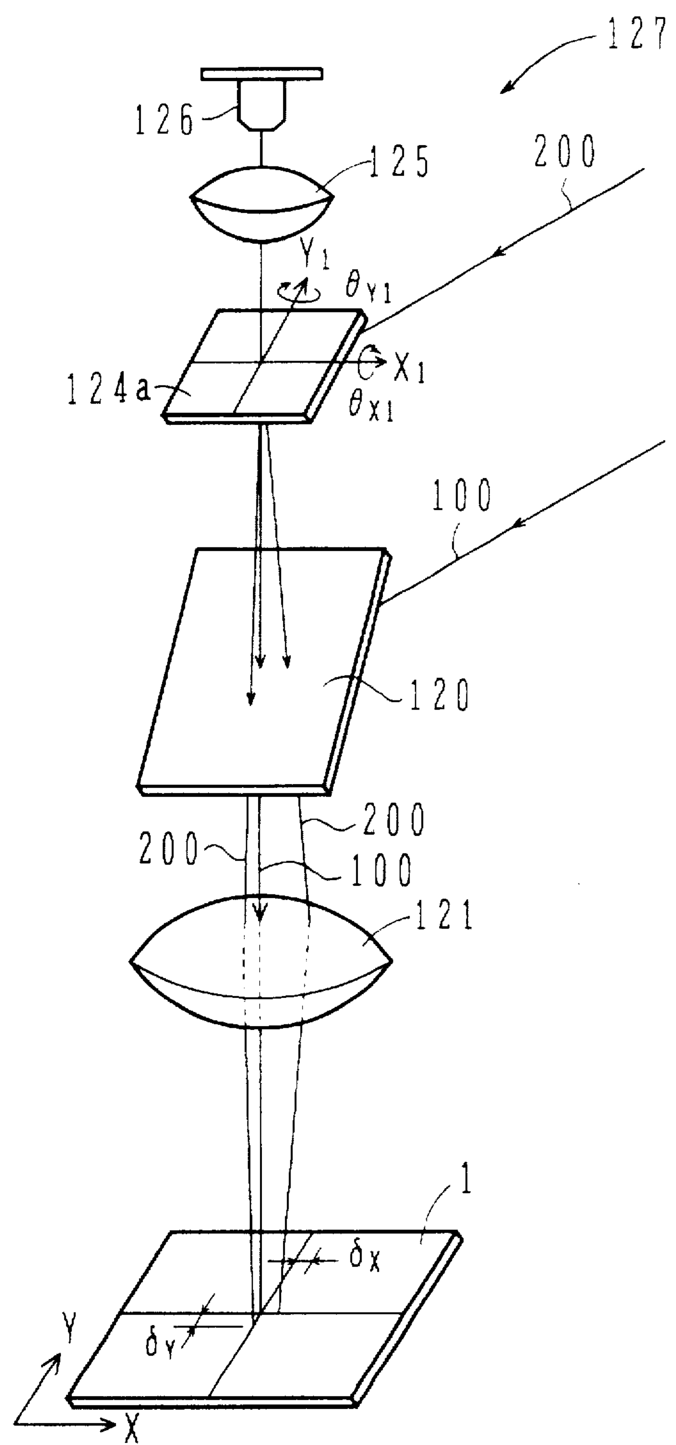
FIG. 13 is a view schematically showing the relationship between the angle of inclination of a half mirror in FIG. 12 and the detected position by a detecting laser beam.

For example, on condition that the X-axis on the workpiece 1 is parallel to the $X_1$-axis on the half mirror 124a as shown in FIG. 13, the detected position on the workpiece 1 is varied (or moved) by $\delta_Y$ in the Y-axis direction when the half mirror 124a is rotated about the $X_1$-axis by a small angle of $\theta_{X1}$. Given the focal length of the condensing lens 121 as F, that $\delta_Y$ is expressed by:

$$\delta_Y = F \cdot \tan(-2 \cdot \theta_{X1}) \quad (5)$$

Also, when the half mirror 124a is rotated about the $Y_1$-axis by a small angle of $\theta_{Y1}$, the detected position on the workpiece 1 is varied (or moved) by in the X-axis direction and the resulting change $\delta_X$ is likewise expressed by:

$$\delta_X = F \cdot \tan(-2 \cdot \theta_{Y1}) \quad (6)$$

Thus, by adjusting the angles of $\theta_{X1}$, and $\theta_{Y1}$, the distance on the workpiece 1 can optionally be set and changed.

Further, if the relative offset of the irradiated position of the detecting laser beam 200 with respect to the irradiated position of the processing laser beam 100 is represented by $\delta_{rk}$=(offset in the X-axis direction, offset in the Y-axis direction), the relative offset is given below for each of the paths 5a to 5d (see FIG. 6) of the spot along the four sides of the lead frame:

$$\delta_{r1} = (0, -\delta_d) \quad (7)$$

$$\delta_{r2} = (\delta_d, 0) \quad (8)$$

$$\delta_{r3} = (0, \delta_d) \quad (9)$$

$$\delta_{r4} = (-\delta_d, 0) \quad (10)$$

Based on these data, the half mirror 124a is adjusted. Note that k corresponds to the order in which the four sides are processed (from 5a to 5d) and is any integer from 1 to 4, i.e., k=1 to 4. Also, $\delta_d$ is a value set to meet the relationship of $\delta_d > W_{DB}/2$, as explained above, taking into account the width $W_{DB}$ of the dam bar 2.

The detection signal from the photosensor 126 is subjected to the signal processing in a like manner as in the first embodiment, and the pulse-like processing laser beam 100 is oscillated in accordance with the signal processing.

With this embodiment described above, by changing the angle of inclination of the half mirror 124a as detected position shifting means, the relative location of the irradiated position (detected position) of the detecting laser beam 200 with respect to the irradiated position of the processing laser beam 100 can optionally be varied on the workpiece 1. Accordingly, when cutting off and removing the dam bars 2 in four sides of an IC package, for example, the photosensor 126 can detect the presence or absence of a pin in the detected position, i.e., can distinctly recognize the portion in which the pin exists (hereinafter referred to also as the web portion) 4 and the slit portion 3 depending on the size and shape of the IC package by adjusting the above relative location through the half mirror 124a for each of the four sides. As a result, the dam bar 2 to be removed can be cut off based on the detection signal from the photosensor 126.

Sixth Embodiment

Next, a sixth embodiment of the present invention will be described with reference to FIG. 14.

Figure 14:
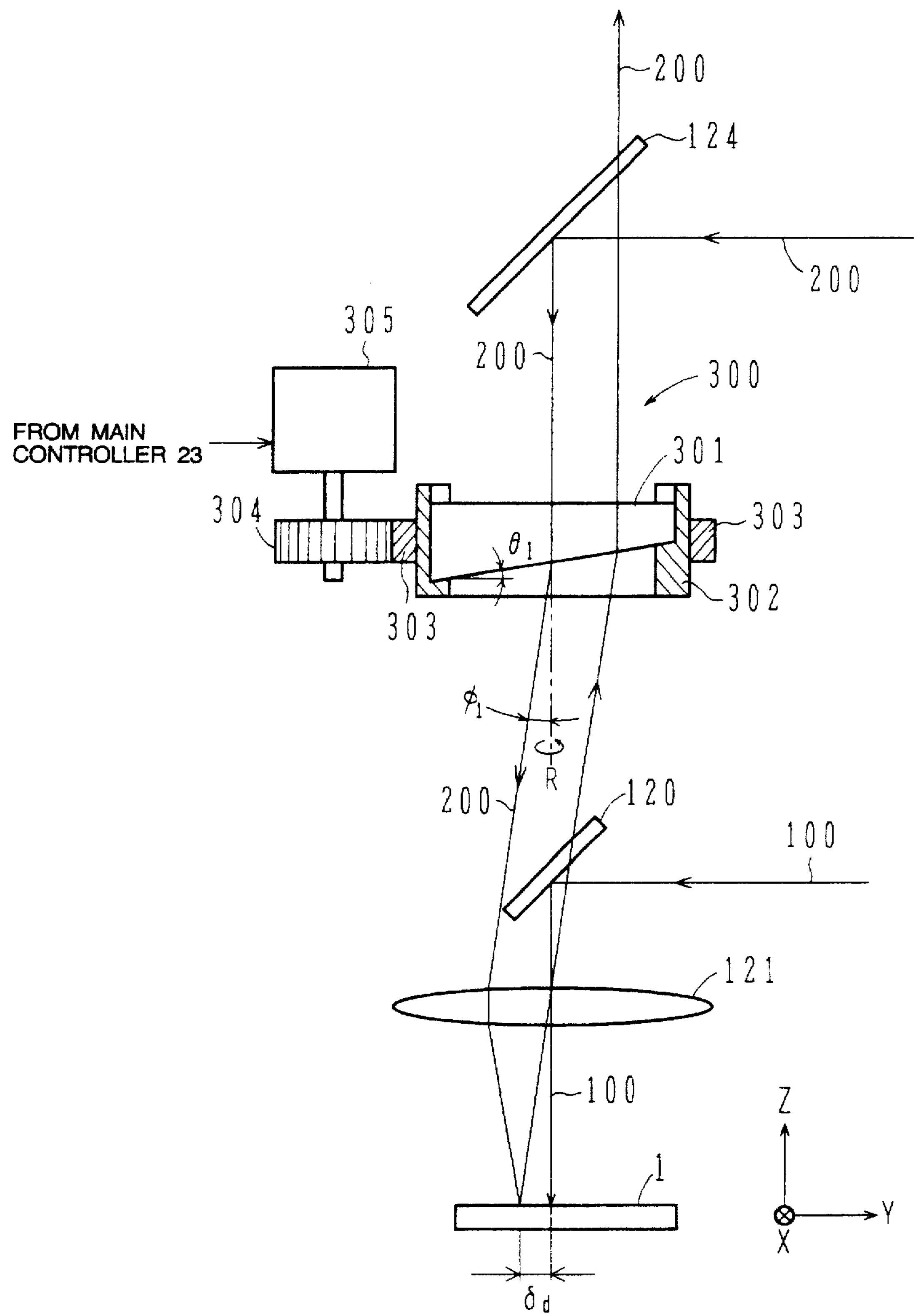
FIG. 14 is a view for explaining a sixth embodiment of the present invention, the view showing a rotary wedge base plate device installed as detected position shifting means.

In this embodiment, a rotary wedge base plate device schematically shown in FIG. 14 is employed as the detected position shifting means instead of the half mirror 124a used in the fifth embodiment. The remaining arrangements are the same as in the fifth embodiment.

Referring to FIG. 14, a rotary wedge base plate device 300 comprises one wedge base plate 301, a frame 302 for supporting the wedge base plate 301, a pinion 303 attached to an outer periphery of the frame 302, another pinion 304 held in mesh with the pinion 303, and a motor 305 for rotatively driving the pinion 304.

When the rotation of the motor 305 is transmitted through the pinion 304 and the pinion 303, the frame 302 and hence the wedge base plate 301 are rotate d about an original optical axis R of the detecting laser beam 200 so that any desired angle of rotation can be set. After entering the wedge base plate 301, the detecting laser beam 200 exits from the same and advances while inclining at a certain angle of $\phi_1$ with respect to the original optical axis thereof. The angle $\phi_1$ depends on an angle $\phi_1$ at which a sloped surface of the wedge base plate 301 inclines.

In this embodiment, since the inclination angle of the sloped surface of the wedge base plate 301 is constant at $\phi_1$, the detecting laser beam 200 exiting from the wedge base plate 301 advances while inclining at the certain angle of $\phi_1$ with respect to the original optical axis R thereof, so that the location apart by a certain distance $\delta_d$ from the irradiated position of the processing laser beam 100 can be detected. Assuming that the focal length of the condensing lens 121 is F and the refraction index of the wedge base plate 301 for the detecting laser beam 200 is n, the relationship between $\delta_d$ and $\phi_1$ is expressed by:

$$\delta_d = F \cdot (n-1) \cdot \phi_1 \quad (11)$$

When the laser processing apparatus of this embodiment having the rotary wedge base plate device 300 explained above is employed to cut off and remove the dam bars 2 in four sides of an IC package as shown in FIG. 7, the relative offset $\delta_{rk}$ (k=1 to 4) of the irradiated position of the detecting laser beam 200 with respect to the irradiated position of the processing laser beam 100 for each of the four sides is expressed similarly to that in the fifth embodiment, and the angle of rotation of the wedge base plate 301 is adjusted based on those data. With such adjustment, the detected position by the detecting laser beam 200 can properly be shifted for each of four directions corresponding to the four sides.

More specifically, first, by operating the XY-table 21 to move the processed position at the constant speed v in the positive direction of the X-axis, the dam bars 2 in one of the four sides are removed by the processing laser beam 100 in the same manner as in any of the foregoing embodiments based on the detection signal resulting from the reflected light of the detecting light 200. Then, after the dam bars in that one side have been cut off completely, the wedge base plate 301 is rotated 90° about the optical axis R by the motor 305 (clockwise when the dam bars are cut off following the sequence shown in FIG. 6). After that, the dam bars 2 are cut off and removed in synchronism with the detection signal resulting from the reflected light of the detecting light 200 in a like manner by rotating the wedge base plate 301 clockwise 90° at a time for each of the remaining sides. During those steps, the motor 305 for controlling the rotation of the wedge prism 301 is automatically controlled in accordance with a command from the main controller 23 in synch with, e.g., the movement of the XY-table 21 depending on the paths to be followed. In this case, the incident angle of the detecting laser beam 200 toward the detected position is changed by the rotary wedge base plate device 300 through uniaxial control (in the rotating direction of the wedge base plate 301).

In this embodiment, so long as the inclination angle $\phi_1$ of the sloped surface of the wedge base plate 301 is constant, the relative distance $\delta_d$ from the irradiated position of the detecting laser beam 200 to the irradiated position of the processing laser beam 100 is not changed and remains also constant. When cutting off and removing dam bars of one IC package, because it can be supposed that the dame bars in four sides of the package have substantially the same shape, the dam bars can be cut off in a satisfactory manner just by rotating the wedge base plate 301 clockwise 90° at a time for each of the four sides even if $\delta_d$ is constant. Also, when cutting off and removing dam bars of another IC package having the same configuration, the dam bars can be cut off in a like manner by using the same wedge base plate 301. In the case of an IC package having a different configuration, it is only required to change the wedge base plate to other one of which sloped surface has a different inclination angle $\phi_1$ corresponding to the package configuration.

With this embodiment explained above, there can also be provided the similar advantage as in the fifth embodiment. Further, since the wedge base plate device 300 is controlled through uniaxial control, the control required is simple.

Seventh Embodiment

Next, a seventh embodiment of the present invention will be described with reference to FIG. 15.

In this embodiment, an image rotating prism 351 as shown in FIG. 15 is employed as the detected position shifting means instead of the half mirror 124a used in the fifth embodiment. The remaining arrangements are the same as in the fifth embodiment.

Figure 15A:
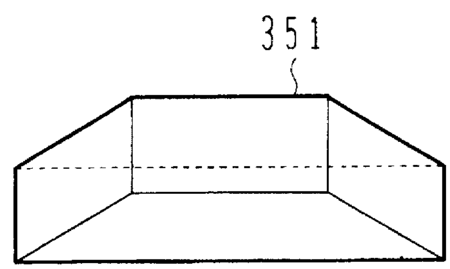
FIG. 15A is a view for explaining a seventh embodiment of the present invention, the view showing an image rotating prism used as detected position shifting means.
Figure 15B:
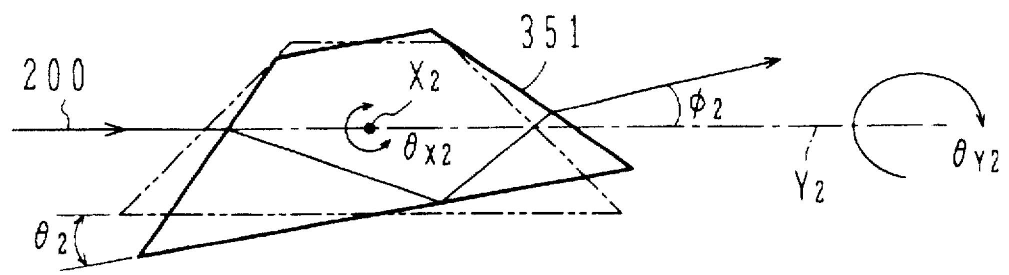
FIG. 15B is a view showing optical paths of the detecting laser beam passing through the image rotating prism in FIG. 15A.

The image rotating prism 351 is similar to an image rotator described in JP, A, 64-76720, for example, and has such a shape as formed by chambering an apex portion of a triangular prism shown in FIG. 15A. The image rotating prism 351 is an optical member by which, when it is rotated by a certain angle about an optical axis, light passing through and exiting from the member is rotated by an angle twice the rotation angle of the member. As shown in FIG. 15B, the image rotating prism 351 is tiltable (in a direction indicated by $\phi_{X2}$ in the drawing) about an axis $X_2$ perpendicular to the original optical axis of the detecting laser beam 200 and is rotatable (in a direction indicated by $\phi_{Y2}$ in the drawing) about an axis $Y_2$ coincident with the original optical axis of the detecting laser beam 200. Thus, the image rotating prism 351 is mounted such that an angle of inclination and an angle of rotation can each be set to any desired value. Here, an inclination angle $\phi_2$ Of the image rotating prism 351 about the axis $X_2$ in FIG. 15B corresponds to an inclination angle thereof with respect to the original axis of the detecting light 200. Note that arrangements of devices for controlling the inclination of the image rotating prism 351 about the axis $X_2$ and the rotation of the prism 352 about the axis $Y_2$ are not shown for the brevity of the drawings.

After entering the image rotating prism 351, the detecting laser beam 200 exits from the same and advances while inclining at a certain angle of $\phi_2$ with respect to the original optical axis thereof. The angle $\phi_2$ is the same as the inclination angle of the image rotating prism 351 with respect to the original optical axis of the detecting light 200, i.e., the inclination angle $\phi_2$ thereof about the axis $X_2$. By setting the inclination angle $\phi_2$ and then rotating the image rotating prism 351 about the axis $Y_2$, i.e., the original optical axis of the detecting light 200, while the inclination angle $\phi_2$ is kept at the set value, the detected position on the workpiece 1 by the detecting laser beam 200 can be revolved by any desired angle on the circumference of a circle having a certain radius in the vicinity of the processed position. The radius of the above circle corresponds to the above-mentioned $\delta_d$. Further, by changing the inclination angle $\phi_2$ of the image rotating prism 351, the inclination angle $\phi_2$ of an optical path of the detecting laser beam 200 having passed through the image rotating prism 351 is also changed, enabling the radius of the circle along which the detected position on the workpiece 1 moves, i.e., the magnitude of $\delta_d$ to be varied.

When the laser processing apparatus of this embodiment having the image rotating prism 351 explained above is employed to cut off and remove dam bars in four sides of an IC package, the angle of rotation of the image rotating prism 351 about the original optical axis (i.e., the axis $Y_2$) of the detecting laser beam 200 incident upon the image rotating prism 351 is adjusted, as with the fifth embodiment, based on the relative offset ($\delta_{rk}$) of the irradiated position of the detecting laser beam 200 with respect to the irradiated position of the processing laser beam 100 for each of the four sides. With such adjustment, the detected position by the detecting laser beam 200 can properly be shifted for each of four directions corresponding to the four sides.

More specifically, first, by operating the XY-table 21 to move the processed position at the constant speed v in the positive direction of the X-axis after the inclination angle $\phi_2$ of the image rotating prism 351 has been set to a certain angle, the dam bars 2 in one side are removed by the processing laser beam 100 based on the detection signal resulted from the reflected light of the detecting light 200. Then, after the dam bars in that one side have been cut off completely, the image rotating prism 351 is rotated 90° about the axis $Y_2$ (clockwise when the dam bars are cut off following the sequence shown in FIG. 6). On this occasion, as a general rule, the inclination angle $\phi_2$ of the image rotating prism 351 is kept constant at the same value as initially set. After that, the dam bars 2 are cut off and removed in synchronism with the detection signal resulting from the reflected light of the detecting light 200 in a like manner by rotating the image rotating prism 351 clockwise 90° at a time for each of the remaining sides.

The rotation of the image rotating prism 351 is automatically controlled in accordance with a command from the main controller 23 in synchronism with, e.g., the movement of the XY-table 21 depending on the paths to be followed. In this case, the incident angle of the detecting laser beam 200 toward the detected position is changed by the image rotating prism device 351 through uniaxial control (in the rotating direction $\phi_{Y2}$ of the image rotating prism 351) made on condition that the other axis (corresponding to the inclining direction $\phi_{X2}$ of the image rotating prism 351 with respect to the original optical axis of the detecting laser beam 200 entering the prism 351) is held fixed.

In this embodiment, by changing the inclination angle $\phi_2$ of the image rotating prism 351, the magnitude of $\delta_d$ can be varied. Therefore, when dam bars of one IC package are cut off completely and, thereafter, dam bars of another IC package having a different configuration are cut off for removal, the relative distance $\delta_d$ between the irradiated position of the processing laser beam 100 and the irradiated position of the detecting laser beam 200 can be varied just by changing the inclination angle $\phi_2$ of the image rotating prism 351 depending on the package configuration. Also, even when dam bars of one IC package are irregularly changed in their shape for some reason, the relative distance $\delta_d$ between the irradiated position of the processing laser beam 100 and the irradiated position of the detecting laser beam 200 can be varied just by changing the inclination angle $\phi_2$ of the image rotating prism 351 correspondingly.

With this embodiment explained above, there can also be provided the similar advantage as in the fifth embodiment. Further, since the image rotating prism device 351 is controlled through uniaxial control made on condition that the other axis is held fixed, the control required is simple. In addition, just by changing the inclination angle $\phi_2$ of the image rotating prism 351 depending on the configuration of the workpiece, the relative distance $\delta_d$ between the irradiated position of the processing laser beam 100 and the irradiated position of the detecting laser beam 200 can be varied.

While any of the foregoing seven embodiments employs the reflected light of the detecting laser beam 200 from the workpiece 1, the transmitted light of the detecting laser beam 200 that has transmitted through the slit portion 3 may be utilized. Furthermore, the present invention is also applicable to other cases than cutting of dam bars of lead frames by utilizing a response of the reflected light of the detecting laser beam 200 with respect to unevenness of the workpiece surface, or a response of the transmitted light of the detecting laser beam 200 through the workpiece 1.

INDUSTRIAL APPLICABILITY

According to the present invention, of detection signals based on light rays from each of the processed positions, the detection signal resulted from the light generated upon the laser processing is omitted and only the detection signal resulted from the detecting light is utilized. Therefore, the processed position can be detected reliably and accurately, and the processing laser beam can surely be irradiated to the desired processed position to process the workpiece in accordance with the detection signal on the basis of information about the surface of the workpiece. As a result, the laser beam is prevented from being irradiated unnecessarily to false positions other than the preset processed positions. Also, the workpiece can be processed at high speed in the desired positions where the material of the workpiece is to be processed, for not only the case in which the processed positions are spaced from one another with equal intervals, but also the case in which the processed positions are not spaced from one another with equal intervals.

Further, since the detecting light is provided as a detecting laser beam which can be condensed into a very small spot and has a stable output subjected to less time-dependent fluctuations, high resolution is ensured so that the surface condition such as the presence or absence of the workpiece material can be detected reliably and accurately. In addition, since the detecting light can be of monochromatic light, chromatic aberration of the optical parts is eliminated and hence detecting error are reduced. If a semiconductor laser is used as the detecting light source, the service life of the light source can be prolonged.

Moreover, since the relative location of the detected position by the detecting laser beam with respect to the irradiated position of the processing laser beam is changed on the workpiece by using the detected position shifting means, the detected position by the detecting laser beam can optionally be changed depending on the size and configuration of the workpiece without any troublesome operation, making it possible to set the optimum detected position.

Consequently, the present invention is suitable for, by way of example, cutting off dam bars of an IC package of the structure that a semiconductor chip is mounted on a lead frame and the assembly is integrally sealed off by resin molding.

We claim:

1. A laser processing apparatus comprising a laser oscillator for oscillating and generating a pulse-like processing laser beam, a processing optical system for introducing said processing laser beam to a processing position of a workpiece, and carrying means for moving said workpiece and determining the processing position of said workpiece, said apparatus further comprising:

a detecting light source for generating a detecting light for detection of the presence or absence of said workpiece near said processing position, detecting means for detecting a light from a portion near said processing position and generating a detection signal corresponding to the detected light, trigger signal generating means for generating a trigger signal from said detection signal by removing an influence of a light generated upon laser processing to allow said trigger signal to exclusively correspond to the reflected light or the transmitted light of the detecting light, control means for controlling the oscillation of said processing laser beam at a timing based on the trigger signal so that said processing laser beam is irradiated on a predetermined processing portion of said workpiece, and wherein said trigger signal generating means comprises rectangular wave signal generating means for generating a rectangular wave signal by binary-coding the detection signal from said detecting means with a threshold ($V_{TH1}$ of a predetermined value, gate signal generating means for generating a gate signal having a predetermined gate width at the same time as the oscillation of said processing laser beam, and gating means for allowing said trigger signal to be generated from said rectangular wave signal existing when said gate signal is switched off, but preventing a trigger signal from being generated from said rectangular wave signal existing when said gate signal is switched on.

2. A laser processing apparatus according to claim 1, wherein said detecting light source is a detecting laser beam source for irradiating a detecting laser beam to a detected position near said processing position.

3. A laser processing apparatus according to claim 2, further comprising detected position shifting means for changing the relative location of the detected position by said detecting laser beam with respect to the processing position of said processing laser beam on said workpiece.

4. A laser processing method in which a workpiece is moved for determining a processing position of said workpiece, and a pulse-like processing laser beam is irradiated from a laser oscillator to said processing position for processing said workpiece, wherein: the laser processing method is carried out using said laser processing apparatus according to claim 3, comprising:

irradiating a detecting light for detection of the presence or absence of said workpiece near said processing position on a portion near said processing position, generating a trigger signal based on the reflected light or the transmitted light of the detecting light, and irradiating said processing laser beam on a predetermined processing position of said workpiece at a timing based on said trigger signal.

5. A dam bar processing method for cutting off dam bars of an IC package in which a semiconductor chip is mounted on a lead frame as an assembly and the assembly is integrally sealed off by resin molding, wherein: said dam bars are cut off by the laser processing apparatus according to claim 3 whereby a detecting light is irradiated on a location near a processing position, a trigger signal is generated based on a reflected light or transmitted light of said detecting light, and the oscillation of a processing laser beam is controlled so that said processing laser beam is irradiated on each of said dam bars at a timing based on said trigger signal.

6. A laser processing method in which a workpiece is moved for determining a processing position of said workpiece, and a pulse-like processing laser beam is irradiated from a laser oscillator to said processing position for processing said workpiece, wherein: the laser processing method is carried out using said laser processing apparatus according to claim 2, comprising:

irradiating a detecting light for detection of the presence or absence of said workpiece near said processing position on a portion near said processing position, generating a trigger signal based on the reflected light or the transmitted light of the detecting light, and irradiating said processing laser beam on a predetermined processing position of said workpiece at a timing based on said trigger signal.

7. A dam bar processing method for cutting off dam bars of an IC package in which a semiconductor chip is mounted on a lead frame as an assembly and the assembly is integrally sealed off by resin molding, wherein: said dam bars are cut off by the laser processing apparatus according to claim 2 whereby a detecting light is irradiated on a location near a processing position, a trigger signal is generated based on a reflected light or transmitted light of said detecting light, and the oscillation of a processing laser beam is controlled so that said processing laser beam is irradiated on each of said dam bars at a timing based on said trigger signal.

8. A laser processing apparatus according to claim 1, wherein said processing optical system includes a condensing lens for condensing said processing laser beam to said processing position, said condensing lens allowing said detecting light as well to pass therethrough and introducing said detecting light onto said workpiece.

9. A laser processing method in which a workpiece is moved for determining a processing position of said workpiece, and a pulse-like processing laser beam is irradiated from a laser oscillator to said processing position for processing said workpiece, wherein: the laser processing method is carried out using said laser processing apparatus according to claim 1, comprising:

irradiating a detecting light for detection of the presence or absence of said workpiece near said processing position on a portion near said processing position, generating a trigger signal based on the reflected light or the transmitted light of the detecting light, and irradiating said processing laser beam on a predetermined processing position of said workpiece at a timing based on said trigger signal.

10. A dam bar processing method for cutting off dam bars of an IC package in which a semiconductor chip is mounted on a lead frame as an assembly and the assembly is integrally sealed off by resin molding, wherein: said dam bars are cut off by the laser processing apparatus according to claim 1 whereby a detecting light is irradiated on a location near a processing position, a trigger signal is generated based on a reflected light or transmitted light of said detecting light, and the oscillation of a processing laser beam is controlled so that said processing laser beam is irradiated on each of said dam bars at a timing based on said trigger signal.

11. A laser processing apparatus comprising a laser oscillator for oscillating and generating a pulse-like processing laser beam, a processing optical system for introducing said processing laser beam to a processing position of a workpiece, and carrying means for moving said workpiece and determining the processing position of said workpiece, said apparatus further comprising:

a detecting light source for generating a detecting light for detection of the presence or absence of said workpiece near said processing position, detecting means for detecting a light from a portion near said processing position and generating a detection signal corresponding to the detected light, trigger signal generating means for generating a trigger signal from said detection signal by removing an influence of a light generated upon laser processing to allow said trigger signal to exclusively correspond to the reflected light or the transmitted light of the detecting light, control means for controlling the oscillation of said processing laser beam at a timing based on the trigger signal so that said processing laser beam is irradiated on a predetermined processing portion of said workpiece, and wherein said trigger signal generating means comprises rectangular wave signal generating means for generating a rectangular wave signal by binary-coding said detection signal from said detecting means with a threshold of a value that is higher than a level of a portion in the detection signal resulting from the light generated upon the laser processing said trigger signal being generated from the rectangular wave signal.

12. A laser processing apparatus according to claim 11, wherein said detecting light source is a detecting laser beam source for irradiating a detecting laser beam to a detected position near said processing position.

13. A laser processing apparatus according to claim 11, wherein said processing optical system includes a condensing lens for condensing said processing laser beam to said processing position, said condensing lens allowing said detecting light as well to pass therethrough and introducing said detecting light onto said workpiece.

14. A laser processing method in which a workpiece is moved for determining a processing position of said workpiece, and a pulse-like processing laser beam is irradiated from a laser oscillator to said processing position for processing said workpiece, wherein: the laser processing method is carried out using said laser processing apparatus according to claim 11, comprising:

irradiating a detecting light for detection of the presence or absence of said workpiece near said processing position on a portion near said processing position, generating a trigger signal based on the reflected light or the transmitted light of the detecting light, and irradiating said processing laser beam on a predetermined processing position of said workpiece at a timing based on said trigger signal.

15. A dam bar processing method for cutting off dam bars of an IC package in which a semiconductor chip is mounted on a lead frame as an assembly and the assembly is integrally sealed off by resin molding, wherein: said dam bars are cut off by the laser processing apparatus according to claim 11 whereby a detecting light is irradiated on a location near a processing position, a trigger signal is generated based on a reflected light or transmitted light of said detecting light, and the oscillation of a processing laser beam is controlled so that said processing laser beam is irradiated on each of said dam bars at a timing based on said trigger signal.

16. A laser processing apparatus comprising a laser oscillator for oscillating and generating a pulse-like processing laser beam, a processing optical system for introducing said processing laser beam to a processing position of a workpiece, and carrying means for moving said workpiece and determining the processing position of said workpiece, said apparatus further comprising:

a detecting light source for generating a detecting light for detection of the presence or absence of said workpiece near said processing position, detecting means for detecting a light from a portion near said processing position and generating a detection signal corresponding to the detected light, trigger signal generating means for generating a trigger signal from said detection signal by removing an influence of a light generated upon laser processing to allow said trigger signal to exclusively correspond to the reflected light or the transmitted light of the detecting light, control means for controlling the oscillation of said processing laser beam at a timing based on the trigger signal so that said processing laser beam is irradiated on a predetermined processing portion of said workpiece, and wherein said trigger signal generating means comprises rectangular wave signal generating means for generating a rectangular wave signal by binary-coding the detection signal from said detecting means with a threshold of a predetermined value, and means for generating said trigger signal by using pulses of said rectangular wave signal from said rectangular wave signal generating means alternately.

17. A laser processing apparatus according to claim 16, wherein said detecting light source is a detecting laser beam source for irradiating a detecting laser beam to a detected position near said processing position.

18. A laser processing apparatus according to claim 16, wherein said processing optical system includes a condensing lens for condensing said processing laser beam to said processing position, said condensing lens allowing said detecting light as well to pass therethrough and introducing said detecting light onto said workpiece.

19. A laser processing method in which a workpiece is moved for determining a processing position of said workpiece, and a pulse-like processing laser beam is irradiated from a laser oscillator to said processing position for processing said workpiece, wherein: the laser processing method is carried out using said laser processing apparatus according to claim 16, comprising:

irradiating a detecting light for detection of the presence or absence of said workpiece near said processing position on a portion near said processing position, generating a trigger signal based on the reflected light or the transmitted light of the detecting light, and irradiating said processing laser beam on a predetermined processing position of said workpiece at a timing based on said trigger signal.

20. A dam bar processing method for cutting off dam bars of an IC package in which a semiconductor chip is mounted on a lead frame as an assembly and the assembly is integrally sealed off by resin molding, wherein: said dam bars are cut off by the laser processing apparatus according to claim 16 whereby a detecting light is irradiated on a location near a processing position, a trigger signal is generated based on a reflected light or transmitted light of said detecting light, and the oscillation of a processing laser beam is controlled so that said processing laser beam is irradiated on each of said dam bars at a timing based on said trigger signal.

21. A laser processing apparatus comprising a laser oscillator for oscillating and generating a pulse-like processing laser beam, a processing optical system for introducing said processing laser beam to a processing position of a workpiece, and carrying means for moving said workpiece and determining the processing position of said workpiece, said apparatus further comprising:

a detecting light source for generating a detecting light for detection of the presence or absence of said workpiece near said processing position, detecting means for detecting a light from a portion near said processing position and generating a detection signal corresponding to the detected light, trigger signal generating means for generating a trigger signal from said detection signal by removing an influence of a light generated upon laser processing to allow said trigger signal to exclusively correspond to the reflected light or the transmitted light of the detecting light, control means for controlling the oscillation of said processing laser beam at a timing based on the trigger signal so that said processing laser beam is irradiated on a predetermined processing portion of said workpiece, wherein said detecting light source is a detecting laser beam source for irradiating a detecting laser beam to a detected position near said processing position, further comprising detected position shifting means for changing the relative location of the detected position by said detecting laser beam with respect to the processing position of said processing laser beam on said workpiece, and wherein said detected position shifting means includes a reflecting mirror being tiltable about each of two axes orthogonal to each other in a reflecting surface thereof and allowing the light from said detected position to enter said detecting means.

22. A laser processing method in which a workpiece is moved for determining a processing position of said workpiece, and a pulse-like processing laser beam is irradiated from a laser oscillator to said processing position for processing said workpiece, wherein: the laser processing method is carried out using said laser processing apparatus according to claim 21, comprising:

irradiating a detecting light for detection of the presence or absence of said workpiece near said processing position on a portion near said processing position, generating a trigger signal based on the reflected light or the transmitted light of the detecting light, and irradiating said processing laser beam on a predetermined processing position of said workpiece at a timing based on said trigger signal.

23. A dam bar processing method for cutting off dam bars of an IC package in which a semiconductor chip is mounted on a lead frame as an assembly and the assembly is integrally sealed off by resin molding, wherein: said dam bars are cut off by the laser processing apparatus according to claim 21 whereby a detecting light is irradiated on a location near a processing position, a trigger signal is generated based on a reflected light or transmitted light of said detecting light, and the oscillation of a processing laser beam is controlled so that said processing laser beam is irradiated on each of said dam bars at a timing based on said trigger signal.

24. A laser processing apparatus comprising a laser oscillator for oscillating and generating a pulse-like processing laser beam, a processing optical system for introducing said processing laser beam to a processing position of a workpiece, and carrying means for moving said workpiece and determining the processing position of said workpiece, said apparatus further comprising:

a detecting light source for generating a detecting light for detection of the Presence or absence of said workpiece near said processing position, detecting means for detecting a light from a portion near said processing position and generating a detection signal corresponding to the detected light, trigger signal generating means for generating a trigger signal from said detection signal by removing an influence of a light generated upon laser processing to allow said trigger signal to exclusively correspond to the reflected light or the transmitted light of the detecting light, control means for controlling the oscillation of said processing laser beam at a timing based on the trigger signal so that said processing laser beam is irradiated on a predetermined processing portion of said workpiece, wherein said detecting light source is a detecting laser beam source for irradiating a detecting laser beam to a detected position near said processing position, further comprising detected position shifting means for changing the relative location of the detected position by said detecting laser beam with respect to the processing position of said processing laser beam on said workpiece, and wherein said detected position shifting means included rotary wedge base plate means disposed between said detecting laser beam source and said workpiece, having a surface inclined with respect to an original optical axis of said detecting laser beam, and being rotatable about said original optical axis.

25. A laser processing method in which a workpiece is moved for determining a processing position of said workpiece, and a pulse-like processing laser beam is irradiated from a laser oscillator to said processing position for processing said workpiece, wherein: the laser processing method is carried out using said laser processing apparatus according to claim 24, comprising:

irradiating a detecting light for detection of the presence or absence of said workpiece near said processing position on a portion near said processing position, generating a trigger signal based on the reflected light or the transmitted light of the detecting light, and irradiating said processing laser beam on a predetermined processing position of said workpiece at a timing based on said trigger signal.

26. A dam bar processing method for cutting off dam bars of an IC package in which a semiconductor chip is mounted on a lead frame as an assembly and the assembly is integrally sealed off by resin molding, wherein: said dam bars are cut off by the laser processing apparatus according to claim 24 whereby a detecting light is irradiated on a location near a processing position, a trigger signal is generated based on a reflected light or transmitted light of said detecting light, and the oscillation of a processing laser beam is controlled so that said processing laser beam is irradiated on each of said dam bars at a timing based on said trigger signal.

27. A laser processing apparatus comprising a laser oscillator for oscillating and generating a pulse-like processing laser beam, a processing optical system for introducing said processing laser beam to a processing position of a workpiece, and carrying means for moving said workpiece and determining the processing position of said workpiece, said apparatus further comprising:

a detecting light source for generating a detecting light for detection of the presence or absence of said workpiece near said processing position, detecting means for detecting a light from a portion near said processing position and generating a detection signal corresponding to the detected light, trigger signal generating means for generating a trigger signal from said detection signal by removing an influence of a light generated upon laser processing to allow said trigger signal to exclusively correspond to the reflected light or the transmitted light of the detecting light, control means for controlling the oscillation of said processing laser beam at a timing based on the trigger signal so that said processing laser beam is irradiated on a predetermined processing portion of said workpiece, wherein said detecting light source is a detecting laser beam source for irradiating a detecting laser beam to a detected position near said processing position, further comprising detected position shifting means for changing the relative location of the detected position by said detecting laser beam with respect to the processing position of said processing laser beam on said workpiece, and wherein said detected position shifting means includes image rotating prism means disposed between said detecting laser beam source and said workpiece, being variable in an angle of inclination with respect to an original optical axis of said detecting laser beam, and being rotatable about said original optical axis.

28. A laser processing apparatus comprising a laser oscillator for oscillating and generating a pulse-like processing laser beam, a processing optical system for introducing said processing laser beam to a processing position of a workpiece, and carrying means for moving said workpiece and determining the processing position of said workpiece, said apparatus further comprising:

a detecting light source for generating a detecting light for detection of the presence or absence of said workpiece near said processing position, detecting means for detecting a light from a portion near said processing position and generating a detection signal corresponding to the detected light, trigger signal generating means for generating a trigger signal from said detection signal by removing an influence of a light generated upon laser processing to allow said trigger signal to exclusively correspond to the reflected light or the transmitted light of the detecting light, control means for controlling the oscillation of said processing laser beam at a timing based on the trigger signal so that said processing laser beam is irradiated on a predetermined processing portion of said workpiece, wherein said detecting light source is a detecting laser beam source for irradiating a detecting laser beam to a detected position near said processing position, wherein said detection means includes an optical filter allowing a portion of the light from the portion near said processing position having at least approximately the same wavelength as said detecting laser beam to pass therethrough, and removing the portion of the light generated upon laser processing, and wherein said trigger signal generating means comprises rectangular wave signal generating means for generating a rectangular wave signal by binary-coding the detection signal from said detecting means with a threshold of a value that is higher than a level of a portion in the detection signal resulting from the light generated upon the laser processing and having passed through said optical filter of the detecting means, said trigger signal being generated from the rectangular wave signal.

* * * * *